United States Patent
Migdal et al.

(10) Patent No.: US 6,611,267 B2
(45) Date of Patent: *Aug. 26, 2003

(54) SYSTEM AND METHOD FOR COMPUTER MODELING OF 3D OBJECTS OR SURFACES BY MESH CONSTRUCTIONS HAVING OPTIMAL QUALITY CHARACTERISTICS AND DYNAMIC RESOLUTION CAPABILITIES

(75) Inventors: Alexander Migdal, Princeton, NJ (US); Alexei Lebedev, Princeton, NJ (US)

(73) Assignee: Viewpoint Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/145,176

(22) Filed: May 14, 2002

(65) Prior Publication Data

US 2002/0167518 A1 Nov. 14, 2002

Related U.S. Application Data

(63) Continuation of application No. 09/699,827, filed on Oct. 30, 2000, now Pat. No. 6,392,647, which is a continuation of application No. 09/274,243, filed on Mar. 22, 1999, now Pat. No. 6,262,739, which is a continuation of application No. 08/730,979, filed on Oct. 16, 1996, now Pat. No. 5,886,702.

(51) Int. Cl.[7] ............................................. G06T 17/00
(52) U.S. Cl. ..................................................... 345/428
(58) Field of Search ................................. 345/419, 428, 345/606, 619, 440, 441, 442

(56) References Cited

U.S. PATENT DOCUMENTS

| | | | |
|---|---|---|---|
| 4,845,651 A | 7/1989 | Aizawa et al. | 345/581 |
| 4,888,713 A | 12/1989 | Falk | 345/582 |
| 4,912,664 A | 3/1990 | Weiss et al. | 716/20 |
| 4,933,889 A | 6/1990 | Meshkat et al. | 345/582 |
| 4,941,114 A | 7/1990 | Shigyo et al. | 716/20 |
| 4,994,989 A | 2/1991 | Usami et al. | 716/20 |
| 5,107,444 A | 4/1992 | Wu | 345/419 |

(List continued on next page.)

*Primary Examiner*—Phu K. Nguyen
(74) *Attorney, Agent, or Firm*—Kenyon & Kenyon

(57) ABSTRACT

A system and method for the rapid creation of an optimized mesh model of a real world object, terrain or other three-dimensional surface. The mesh construction technique provides dynamic "up resolution/down resolution" mesh construction capabilities. The system inserts points into the mesh incrementally, ordering the points before each insertion so that dynamic resolution construction can be maintained. The point ordering process determines the distance each point has from the surface of a given mesh configuration such that the next point added will always be the point bringing the most significant detail to the mesh. This procedure of "optimal simplification" optimizes the mesh by guaranteeing the fewest number of points for the most detail at any given resolution. The present invention also provides a system and method to ensure an optimal quality of mesh at any level of insertion or deletion, following in an exemplary configuration a regularized systemized checking function to maintain a mesh of optimal quality such as by Delaunay triangulation principles. The system stores a history of the insertion and deletion steps in a compact list, which can be used for rapid removal of points or rapid regeneration of the mesh.

35 Claims, 25 Drawing Sheets

U.S. PATENT DOCUMENTS

| | | | |
|---|---|---|---|
| 5,125,038 A | 6/1992 | Meshkat et al. | 382/154 |
| 5,189,626 A | 2/1993 | Colburn | 700/182 |
| 5,193,145 A | 3/1993 | Akeley | 345/420 |
| 5,214,752 A | 5/1993 | Meshkat et al. | 345/423 |
| 5,255,352 A | 10/1993 | Falk | 345/423 |
| 5,257,346 A | 10/1993 | Hanson | 345/582 |
| 5,303,386 A | 4/1994 | Fiasconaro | 345/419 |
| 5,345,490 A | 9/1994 | Finnigan et al. | 378/4 |
| 5,367,615 A | 11/1994 | Economy et al. | 345/441 |
| 5,377,011 A | 12/1994 | Koch | 356/602 |
| 5,379,371 A | 1/1995 | Usami et al. | 345/428 |
| 5,398,307 A | 3/1995 | Arakawa | 345/423 |
| 5,410,644 A | 4/1995 | Thier et al. | 345/582 |
| 5,412,762 A | 5/1995 | Kondo | 345/420 |
| 5,416,729 A | 5/1995 | Leon et al. | 364/578 |
| 5,440,674 A | 8/1995 | Park | 345/423 |
| 5,448,686 A | 9/1995 | Borrel et al. | 345/420 |
| 5,448,687 A | 9/1995 | Hoogerhyde et al. | 345/423 |
| 5,465,323 A | 11/1995 | Mallet | 345/423 |
| 5,475,799 A | 12/1995 | Yoshioka et al. | 345/420 |
| 5,488,692 A | 1/1996 | Karasick et al. | 345/420 |
| 5,497,451 A | 3/1996 | Holmes | 345/420 |
| 5,522,019 A | 5/1996 | Bala et al. | 345/424 |
| 5,553,206 A | 9/1996 | Meshkat | 345/423 |
| 5,561,749 A | 10/1996 | Schroeder | 345/420 |
| 5,563,995 A | 10/1996 | Shirouzu | 345/441 |
| 5,579,454 A | 11/1996 | Billyard et al. | 345/421 |
| 5,581,673 A | 12/1996 | Kikuchi | 345/423 |
| 5,590,248 A | 12/1996 | Zarge et al. | 345/421 |
| 5,602,979 A | 2/1997 | Loop | 345/423 |
| 5,617,322 A | 4/1997 | Yokota | 700/98 |
| 5,630,039 A | 5/1997 | Fossum | 345/443 |
| 5,649,079 A | 7/1997 | Holmes | 345/419 |
| 5,689,577 A | 11/1997 | Arata | 382/128 |
| 5,886,702 A * | 3/1999 | Migdal et al. | 345/423 |
| 5,977,978 A | 11/1999 | Carey et al. | 345/419 |
| 6,046,744 A | 4/2000 | Hoppe | 345/419 |
| 6,262,739 B1 * | 7/2001 | Migdal et al. | 345/423 |
| 6,392,647 B1 * | 5/2002 | Migdal et al. | 345/423 |

FOREIGN PATENT DOCUMENTS

WO     WO 96/06325     2/1996

OTHER PUBLICATIONS

Agishtein, Michael et al, "Smooth Surface Reconstruction from Scattered Data Points", *Comput. & Graphics*, vol. 15, No. 1, pp. 29–39, 1991.

Agishtein, Michael et al., "Geometric Characterization of States in Two–Dimensional Quantum Gravity", submitted to *Physics Letters B*, pp. 1–12, Mar. 1990.

Agishtein, Michael et al., "Dynamics of Vortex Surfaces in Three Dimensions: Theory and Simulations", *Physica D 40*, pp. 91–118, 1989.

"Basic Methods and Algorithms: Voronoi Diagrams, Delaunay Triangulation and Construction of a TIN" Internet site http://www.iko.no, Printed Feb. 12, 1996.

Certain, Andrew et al., "Interactive Multiresolution Surface Viewing", *SIGGRAPH 96 Conference Proceedings*, pp. 91–98, 1996.

Cohen, Jonathan et al., "Simplification Envelopes", *SIGGRAPH 96, Computer Graphics*, Aug. 1996.

DeRose, Tony et al., "Fitting of Surfaces to Scattered Data", In J. Warren, editor, *Curves and Surfaces in Computer Vision and Graphics III*, Proc. SPIE 1830:212–220, 1992.

Eckel, Bruce, "C++ Inside and Out", Osborne McGraw Hill, 1993.

Eck, Matthias et al., "Multiresolution Analysis of Arbitrary Meshes" Technical Report #95–01–02, 1995.

Hoppe, Hugues et al., "Mesh Optimization", *Computer Graphics Proceedings, Annual Conference Series*, pp. 19–26, 1993.

Hoppe, Hugues, "Generation of 3D Geometric Models from Unstructured 3D Points," Microsoft Corporation, 96.

Hoppe, Hugues, "Progressive Meshes", *SIGGRAPH 96 Conference Proceedings*, pp. 99–108, 1996.

Hoppe, Hugues, "Surface Reconstruction from Unorganized Points", PhD thesis, Department of Computer Science and Engineering, University of Washington, Jun. 1994 (TR 94–06–01).

Lindstrom, Peter et al., "Real–Time, Continuous Level of Detail Rendering of Height Fields", *SIGGRAPH 96 Conference Proceedings*, pp. 109–117, 1996.

Migdal, A.A., "Dynamically Triangulated Random Surfaces", *Nuclear Physics B*, Proc. Suppl. 9, pp. 625–630, 1989.

"Multiresolution Modeling", Internet site http://www.cs.cmu.edu/afs..d/www/multires, printed May 7, 1997.

Preparata and Shamos, "Computational Geometry", Springer–Verlag, New York, 1988 (second printing).

Schroeder, William, et al., "Decimation of Triangle Meshes", *Computer Graphics*, 26(2), pp. 65–80, Jul. 1992.

Shewchuk, Jonathan, "A Two–Dimensional Quality Mesh Generator and Delaunay Triangulator", Triangle Website, http://www.cs.cmu.edu/People/quake/triangle.html, printed Mar. 16, 1997.

Stroustrup, Bjarne, "The C++ Programming Language", Addison Wesley Publishing Co., 1991.

Silicon Graphics Indigo$^2$ Impact Website, http://www.sgi.com/Products/hardware/Indigo2/tech.html, printed Jun. 22, 1997.

Silicon Graphics Technology Website, http://www.sgi.com/Products/hardware/desktop/tech.html, printed Jun. 22, 1997.

Turk, Greg et al., "Zippered Polygon Meshes from Range Images" *Computer Graphics (SIGGRAPH '94 Proceedings)*, 28(3):311–318, Jul. 1994.

* cited by examiner

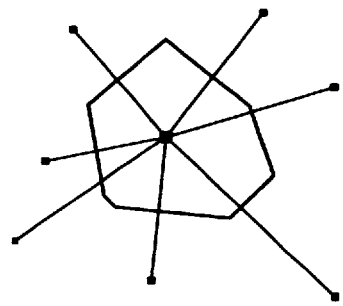
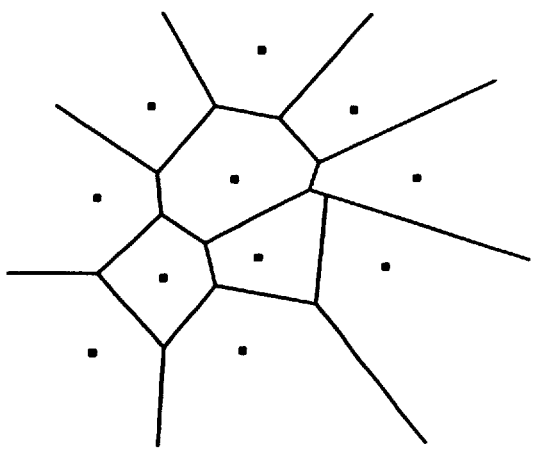
Fig. 1a    Fig. 1b
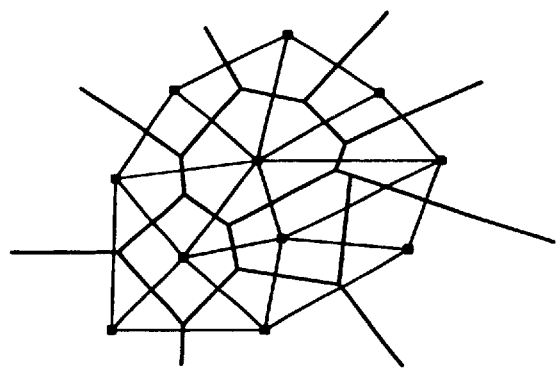
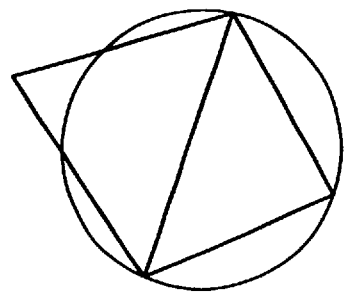
Fig. 1c    Fig. 1d

SYSTEM AND METHOD FOR COMPUTER MODELING OF 3D OBJECTS OR SURFACES BY MESH CONSTRUCTIONS HAVING OPTIMAL QUALITY CHARACTERISTICS AND DYNAMIC RESOLUTION CAPABILITIES

CROSS-REFERENCE TO RELATED APPLICATIONS

This application is a continuation of prior application Ser. No. 09/699,827, filed Oct. 30, 2000, now U.S. Pat. No. 6,392,647 which is a continuation of prior application Ser. No. 09/274,243, filed Mar. 22, 1999, now U.S. Pat. No. 6,262,739, issued Jul. 17, 2001, which is a continuation of Ser. No. 08/730,979, filed Oct. 16, 1996, now U.S. Pat. No. 5,886,702, issued Mar. 23, 1999.

CROSS-REFERENCE TO RELATED APPLICATIONS

This application is related to co-pending United States Patent Application entitled "System and Method for Rapidly Generating an Optimal Mesh Model of a 3D Object or Surface" filed on even date herewith. The co-pending application is expressly incorporated herein by reference.

FIELD OF THE INVENTION

This invention relates to computer systems for three-dimensional ("3D") modeling of real-world objects, terrains and other surfaces. In particular, this invention relates to computer systems which create optimized mesh models of objects and surfaces and have the capability to change dynamically the construction of the model to represent the object or surface in varying levels of detail.

BACKGROUND OF THE INVENTION

There is great interest in the development of computer systems which enable users to generate quickly accurate displays and reproductions of real world objects, terrains and other 3D surfaces. A graphic display and manipulation system generates a mesh model of the object, terrain or surface, uses that mesh model as a basis to create the display or reproduction and allows the user to manipulate the model to create other displays such as "morphs," fantasy displays or special effects. A mesh model represents an object, terrain or other surface as a series of interconnected planar shapes, such as sets of triangles, quadrangles or more complex polygons. More advanced graphic display systems provide rapid zoom and "walk around" capabilities (allowing the viewer to make his or her perceived vantage point appear to move closer to, farther from or about an object or surface). The mesh modeling of these systems must be flexible and provide dynamic resolution capabilities as well as display a high quality reproduction of the object.

A set of data points that describes the object or surface provides basic data for the mesh. The data points represent actual, measured points on the object, surface or terrain. Their values come from a number of sources. A user can input data points based on measurement or planned architecture or they can be generated through scanning and other measuring systems. A scanning system uses a light source such as a laser stripe to scan and a camera to collect images of the scanning light as it reflects from the object. A scanning system processes the information captured in the images to determine a set of measured 3D point values that describe the object, surface or terrain in question. Scanning systems can easily gather the raw data of several hundred thousand 3D coordinates. The data points come to the mesh modeling system as a group of randomly distributed points. Other data concerning the object, terrain or surface, such as a texture map, ambient light data or color or luminosity information, can be associated or used in conjunction with the geometric shapes of the mesh.

Typical mesh modeling systems use data points either indirectly (in gridded network models) or directly (in irregular network models) to create meshes. U.S. Pat. No. 4,888,713 to Falk and U.S. Pat. No. 5,257,346 to Hanson describe ways of creating gridded mesh representations. Gridded network models superimpose a grid structure as the basic framework for the model surface. The grid point vertices form the interconnected geometric faces which model the surface. The computer connects the grid points to form evenly distributed, geometric shapes such as triangles or squares, that fit within the overall grid structure. While gridded models provide regular, predictable structures, they are not well suited for mesh construction based on an irregular, random set of data points, such as those generated through laser scanning (as mentioned above). To fit the irregular data points of a laser scan into a rigid grid structure, the data point values must be interpolated to approximate points at the grid point locations. The need to interpolate increases computation time and decreases the overall accuracy of the model.

Compared to a gridded model, an irregular mesh model provides a better framework for using irregular data points, because the irregularly-spaced data points themselves can be used as the vertices in the framework, without the need to interpolate their values to preset grid point locations. A typical irregular network meshing system builds a mesh by constructing edge lines between data points to create the set of geometric faces that approximate the surface of the object or terrain. There has been widespread interest in building irregular mesh models having planar faces of triangular shapes, as only three points are needed to determine a planar face.

While irregular triangular meshes offer the possibility of more accurate displays, the systems to implement them are more complex compared to gridded network models. The limitations of the computer hardware and the complexity inherent in the data structures needed for implementation of irregular mesh building systems has prevented their widespread use. U.S. Pat. No. 5,440,674 to Park and U.S. Pat. No. 5,214,752 to Meshkat et al. describe meshing systems used for finite element analysis, i.e., the partitioning of CAD diagrams into a series of mesh faces for structural analysis, not the creation of a mesh from a series of raw data points. Further, these systems do not permit dynamic variable resolution. To alter the resolution of the meshes in these systems, the operator must reinitiate and recreate the entire mesh. As such, the systems do not appear suitable for the dynamic mesh generation requirements of applications such as computer animation and special effects.

For computer mesh applications involving the hundreds of thousands of 3D data points typically used in computer animation, there is a need for the creation of a mesh system which can generate a mesh with substantial speed and rapidly vary its resolution. Speed and data storage requirements are also important factors in graphic display applications on communication systems such as the Internet. Currently, Internet graphic displays are typically communicated as massive 2D pixel streams. Each and every pixel displayed in a 2D image must have a pixel assignment. All of those pixel assignments must be transmitted via the communications system. Such a transmission requires large amounts of communication time. Further, if movement is depicted in the display, information must be continuously sent over the communications system to refresh the image or, in the alternative, one large chunk of pixel data must be downloaded to the receiving terminal before the display can begin. Replacing the 2D image display system with a 3D modeling system substantially reduces the amount of data needed to be transmitted across the communication system, because with a 3D modeling system only representative 3D data points need be sent—not a full set of assignments for every pixel displayed. A mesh generating system located at the receiver terminal could generate a full display of the object upon receiving relatively few 3D data points. Currently available meshing systems do not provide this capability.

The demands of computer animation and graphic display also call for improvement in the quality of the mesh. In the case of an irregular triangulated mesh, for example, when the angles of one triangle's corners vary widely from the angles of another triangle or the triangles differ wildly in shape and size, the mesh tends to be difficult to process for functions such as "gluing" (joining a mesh describing one part of an object to a mesh describing an adjacent part). Such a mesh will also display badly. For example, a non-optimized triangulated mesh might show a jagged appearance in the display of what are supposed to be smooth curving surfaces like the sides of a person's face. Generally, an underlying mesh model constructed from small, regularly angled triangles that tend towards being equilateral is preferable.

The procedure of B. Delaunay known as "Delaunay Triangulation" is one optimization theory which researchers have attempted to implement for the construction of a high quality, irregular meshes with homogeneous triangular structure Delaunay's theories for the creation of irregular mesh lattices derive from the teachings of M. G. Voronoi and the studies he made of "Voronoi polygons". Voronoi determined that, for a set of data points in space, a proximity region could be defined for each data point by a convex polygon created from the perpendicular bisectors of lines drawn from the point in question to its nearest neighbors. FIG. 1a shows an example of a Voronoi polygon. Each data point is bounded by a unique Voronoi polygon created through those bisecting lines. The edges of each Voronoi polygon are shared with Voronoi polygons for the interconnected points. Thus, Voronoi's method describes a surface with a series of unique, complex polygons. FIG. 1b depicts an example of a Voronoi polygon diagram.

Delaunay's theories follow the teachings of Voronoi and seek to create an irregular triangulated mesh with a tendency for homogeneous triangles. It has been proven that every vertex of a Voronoi diagram is the common intersection of exactly three polygonal edges. Equivalently, it has been proven that each vertex of a Voronoi polygon is a center of a circle defined by three of the data points bounded by the Voronoi polygons. See, e.g., *Computational Geometry*, Preparata and Shamos, New York, Springes-Verlag, 1988 (second printing). From those observations, it is possible to create from any Voronoi diagram a "straight-line dual" diagram having similar properties. FIG. 1c depicts a straight line dual diagram made from the data points bounded by the Voronoi polygon in FIG. 1b. Notice that the "straight-line dual" is a triangular mesh constructed using the actual data points, not the vertices of the Voronoi polygons created by the bisecting lines. The straight-line dual diagram forms its triangular mesh shape by constructing straight line segments between each pair of data points whose Voronoi polygons share an edge. (See FIG. 1c.) It has been proven that a straight line dual of a Voronoi diagram always produces an irregular triangulated mesh. Ibid.

Delaunay used the Voronoi straight line dual to create triangulated lattices with properties derived from an understanding of the Voronoi polygonal diagram. When a triangulation follows Delaunay principles, a circumcircle defined by the vertices of a triangle will not contain another data point of the mesh. FIG. 1d depicts a circumcircle for determination of whether the triangle meets the Delaunay optimality criteria. A Delaunay mesh procedure guarantees that for each triangle of the mesh the area within a circumcircle created from the three vertices will not contain any other data point of the mesh.

Research shows that a triangulated mesh which adheres to the Delaunay circumcircle principle yields an optimized mesh which behaves well in display and graphic manipulations systems. However, Delaunayian meshing procedures, such as those described by Park and Meshkat, for example, do not operate at high speed to build a mesh from a large set of raw data points and they do not provide dynamic resolution. The few currently available meshing procedures which even attempt to optimize Delaunay theories use slow recursive means that rely on time-consuming parameter passing and checking steps. Such problems have stifled the use of real-life object depictions in computer graphics applications.

Therefore, it would represent a substantial advance in the field if a computer modeling system could be developed that allows for rapid generation of a mesh optimized by principles such as those set forth in the theories of Delaunay and Voronoi and provide dynamic resolution capabilities. Such a system would enable computer graphics systems to use real world images in all applications, including multi-resolution displays. The system would enable communication systems, such as the Internet, to display and manipulate images and models of the real world objects more rapidly.

SUMMARY OF THE INVENTION

The present invention provides a system and method for rapid computer creation of an optimal mesh with dynamic resolution capabilities. The mesh building system and method operates incrementally, building the mesh point-by-point in succession. As each point is added, optimality is preserved through a rapid, non-recursive checking procedure. In an exemplary embodiment, the system of the present invention creates a triangulated mesh, optimized by Delaunay principles. Each point is added to the mesh by linking it to other related points. Once the system establishes an initial Delaunay triangulated mesh, new points may be added quickly. First, the system locates the triangle or area in the existing mesh into which the next point will be added. Next, the system splits this triangle into three triangles, each containing two vertices of the original triangle and the new vertex. The links between the old vertices and the new point form the geometric edges of the triangle. Next, the system checks each triangle in the neighborhood around the insertion point, reconstructing if necessary to maintain an optimal triangulation such as a Delaunay triangulation. One particular advantage of the system is the speed at which it operates in mesh building and checking. The system operates in order (n log n) time and can provide a full mesh of 100,000 data points in ~1.7 seconds operating on a 195 MHZ R10000 processor.

One aspect of the system and method of the present invention is the processing of the data points before insertion. This processing allows for dynamic resolution (up resolution/down resolution) capabilities in the level of detail for the mesh created. In placing the points into the mesh, the present invention teaches that the data points can be ordered such that the first few points (10–50, depending on the object) describe the overall basic shape of the object and each successive point adds increasing detail to that basic shape. The system and method of the present invention provides a detailed ordering routine which guarantees that each next point adds the most significant detail to the mesh compared to all remaining unmeshed points. This ordering permits dynamic "up res" or "down res" mesh construction. To increase resolution, the system adds points to further increase detail. To decrease resolution the system removes the later added points of fine detail before removing the points showing basic detail. At any given increment in the point addition process, the mesh will always have the simplest depiction of the object and contain the most significant points in terms of descriptive detail. The remaining unmeshed points will all be points which add more refined detail compared to those already in the mesh. Thus, the present invention guarantees an optimal, simplified mesh in any configuration. The procedure can be referred to as "optimal simplification."

To maintain optimal simplification, the present invention provides a set of data structures and program elements to manage the ordering and incremental insertion of data points. In an exemplary embodiment, the distance each unmeshed point has in relation to the surface of a given mesh configuration determines the order of significance. As points are added or deleted, the configuration of the mesh changes and, for the remaining unmeshed points, the order of significance must be redetermined. The present invention provides a system for continuously ordering the unmeshed points so that the next most significant point is always identified. The system maintains speed in reordering by identifying after each insertion or deletion the unmeshed points that are affected by the change and performing reevaluation calculations only on those affected points.

To insert a new data point into the mesh, a set of computer program elements and data structures enable a computer processor to implement a series of changes. An inserted point creates additional mesh faces. The inserted point may also require alterations of the edges of the faces to preserve optimality. The system rigidly orders the vertices of the new triangular faces created by the inserted point. In an exemplary embodiment, the vertices of the triangles are ordered in counterclockwise fashion. However, a clockwise or other rigid ordering system is also suitable. The edges of the newly created triangles and the neighboring triangles related to those edges are also ordered in relation to the counterclockwise or other ordering of the vertices of each face. The present invention performs optimality checks in a systemized way, moving in a single direction following the ordering of the points, such as proceeding counterclockwise around the insertion point. The regularized indexing of the vertices (in the counterclockwise or other order) enables the checking procedure to easily orient itself within the mesh and quickly maneuver to check for optimized quality.

As each face is checked, the present invention provides that the results of each check be stored in a history list data structure. The system and method of vertex indexing and the system and method of regularized checking enables the present invention to store only minimal information about the checking. The minimal storage requirements allow for application of the present invention on communication systems like the Internet. The history list is used during point removal to reverse the mesh construction steps that occurred when the data point was inserted. In the present invention, data points are added and deleted from the mesh in LIFO (last in first out) order, thereby keeping the points of most significant detail in the mesh at all times. A data structure maintains a list of inserted points. This list is used in conjunction with the history list to remove points or quickly replicate the mesh in differing levels of detail.

As stated above, the present invention provides a checking process that works in a sequenced, step-wise manner to implement an optimization heuristic such as a Delaunay triangulation. It is an aspect of this invention that a mesh of optimal quality is maintained at all times, even in dynamic up res/down res construction. Delaunay principles dictate that a circumcircle created by the vertices of any mesh triangle will not contain any other data point. If the triangle does not pass that test, then it is not considered optimal and the edges between the vertices must be redefined or "flipped" to create a new set of triangles. The system insures that the vertices and neighbor relationships of the flipped triangles also allow for the sequenced checking.

After flipping, the system and method of the present invention continues to check for optimization, rechecking the flipped triangles and their neighbors and storing the results of that checking on the history list. The present invention teaches that an entire triangulation check must take place in an ordered fashion, such as a counterclockwise or other order as described above. If an ordered system of checking is maintained, and the results are known through the history list, the system can rapidly remove points to provide down resolution capabilities by reversing the system of mesh alterations and removing the added points in LIFO order.

The history file can be used for dynamic up resolution to gain substantial speed increases. After one mesh is built to full resolution using the point ordering and optimality procedures outlined above and collecting the record of the changes in the history list, the mesh can be almost instantaneously generated to any detail level, using the history file instead of reexecuting the ordering and checking procedures. Although building the mesh and storing the changes in the history list increases processing time for an initial mesh (by approximately 13%), the system can mesh with very high speed once the history list has been created. For a cache of 100,000 points in a 195 MHZ R10000 processor, the surface meshes at 700,000 triangles/second. For a cache of 25,000 data points, the system meshes at a speed of 750,000 triangles/second. For a cache of 4,000 data points, the system can mesh at a speed of 1,250,000 triangles/second. The speed will vary depending on the size of the data cache permitted for the data points in the computer system.

The system and method of the present invention comprises computer hardware, programmed and data structure elements. All the elements set forth are described in more detail below.

BRIEF DESCRIPTION OF THE DRAWINGS

FIG. 1a Depicts a diagram of a Voronoi polygon drawn around a data point, and its set of nearest neighbors.

FIG. 1b Depicts a diagram of Voronoi polygons for a set of data points.

FIG. 1c Depicts a straight line dual triangulation for the Voronoi diagram of FIG. 1b.

FIG. 1d Depicts a circumcircle drawn for a triangle in a Delaunay triangulation showing that the region bounded by the circumcircle contains no other point.

DETAILED DESCRIPTION i. Dynamic Meshing

Figure 2:
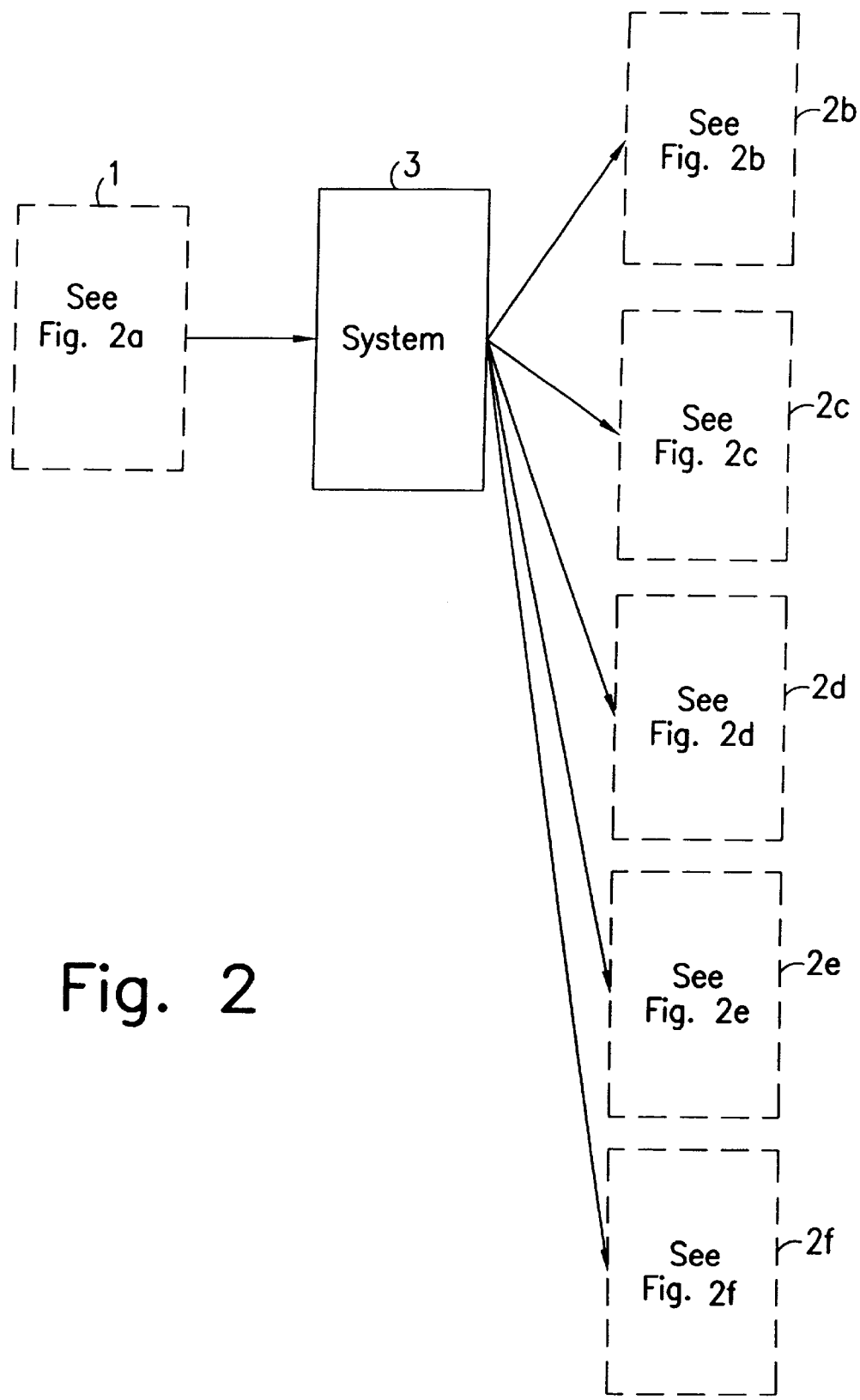
FIG. 2 Depicts a plurality of data points and their transformation into a series of up resolution and down resolution meshes according to the present invention.
Figure 2A:
FIGS. 2a–f Depict a plurality of data points and meshes of different resolutions.

FIG. 2 depicts a plurality of data points 1 which the computer system 3 of the present invention will use to build a series of up resolution and down resolution meshes 2 (e.g., 2b, 2c, 2d, 2e and 2f). FIG. 2a depicts an exemplary plurality of data points 1. The plurality of data points 1, also referred to as a cloud of points, can be collected in any number of ways, such as by user input or scanning. A system and method for collecting data points through scanning is described in pending U.S. patent application Ser. No. 08/620,684, filed on Mar. 21, 1996 and entitled "System and Method for Rapid Shape Digitization and Adaptive Mesh Generation", and in pending U.S. patent application Ser. No. 08/679,498, filed on Jul. 12, 1996 and entitled "Portable 3D Scanning System and Method for Rapid Shape Digitizing and Adaptive Mesh Generation". Those applications are expressly incorporated herein by reference. The computer system 3 processes the incoming data according to the teachings of the present invention and outputs the mesh data structures (represented by meshes 2b–f) which can be displayed, manipulated and used to create depictions of the modeled real-world objects, terrains and other surfaces.

Figure 2B:
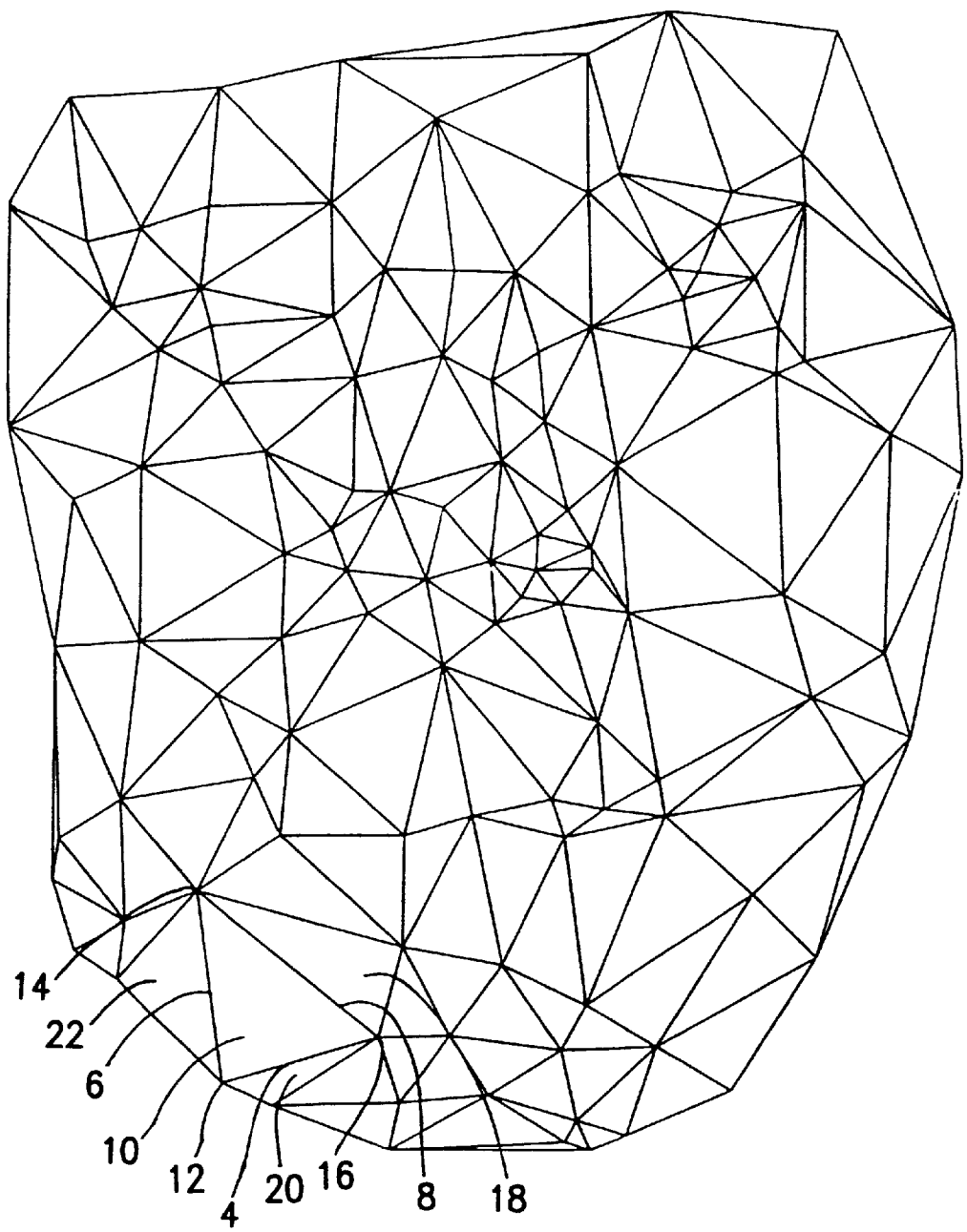
Figure 2C:
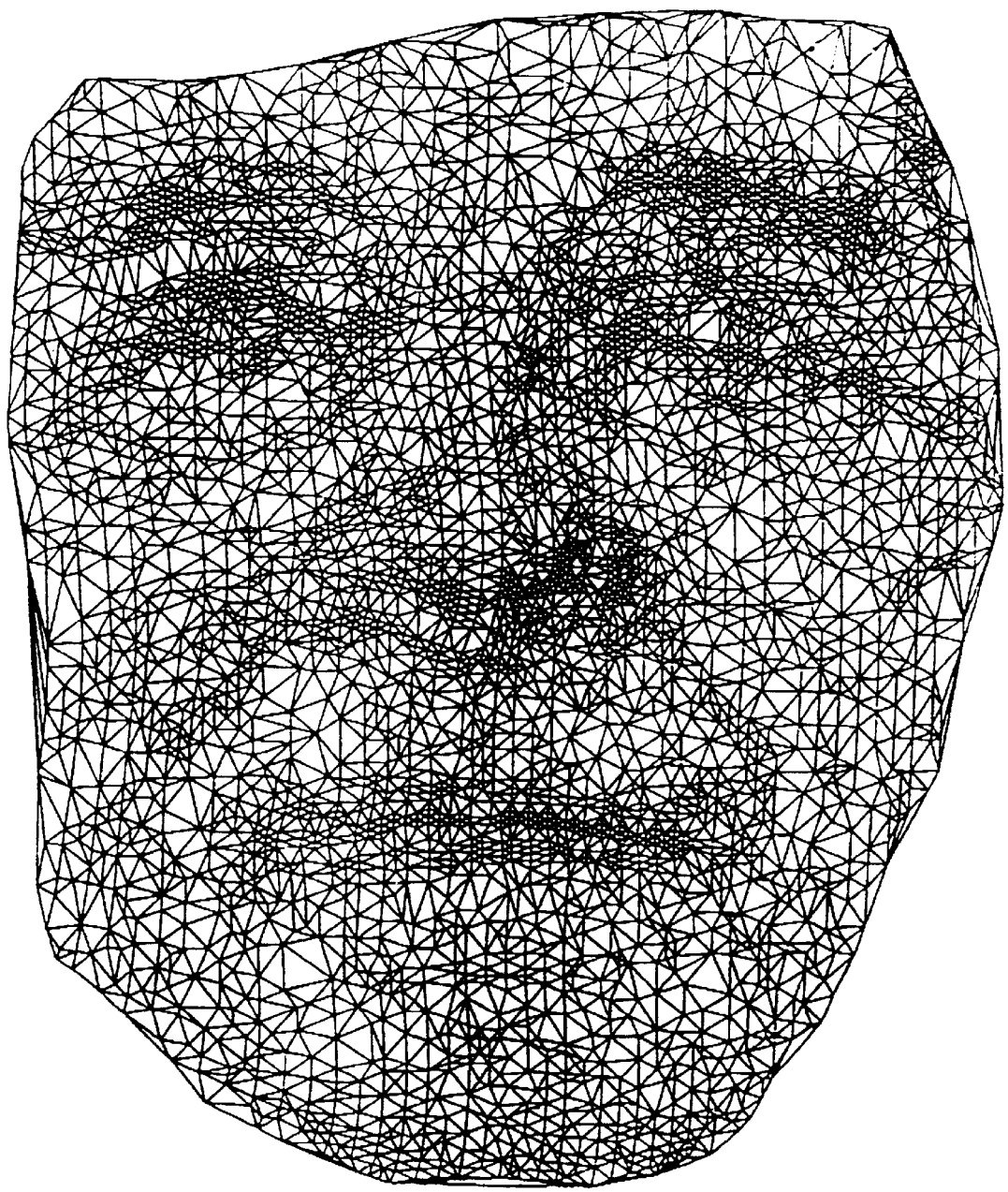
Figure 2D:
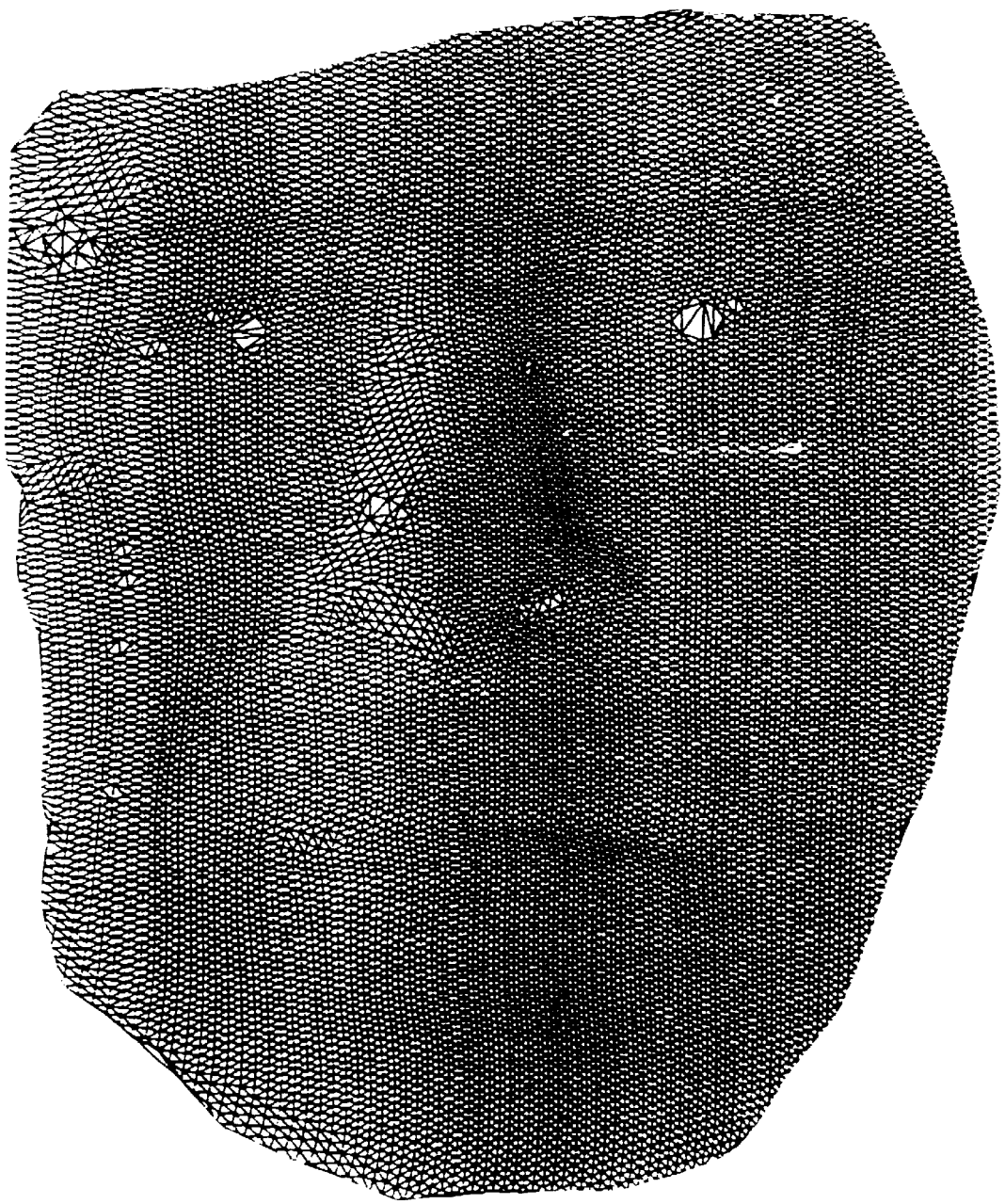

FIG. 2b depicts mesh 2b, an initial mesh of comparatively low resolution. FIG. 2c depicts mesh 2c, a mesh of a middle level of resolution. FIG. 2d depicts mesh 2d, a mesh of highest resolution. The computer system 3 of the present invention permits rapid, almost instantaneous creation of meshes having a graduated increase in the quality of mesh resolution. Each mesh from mesh 2b to 2d continues to incorporate more and more of the data points 1, until, as shown in mesh 2d, all the data points are incorporated into the mesh.

Figure 2E:
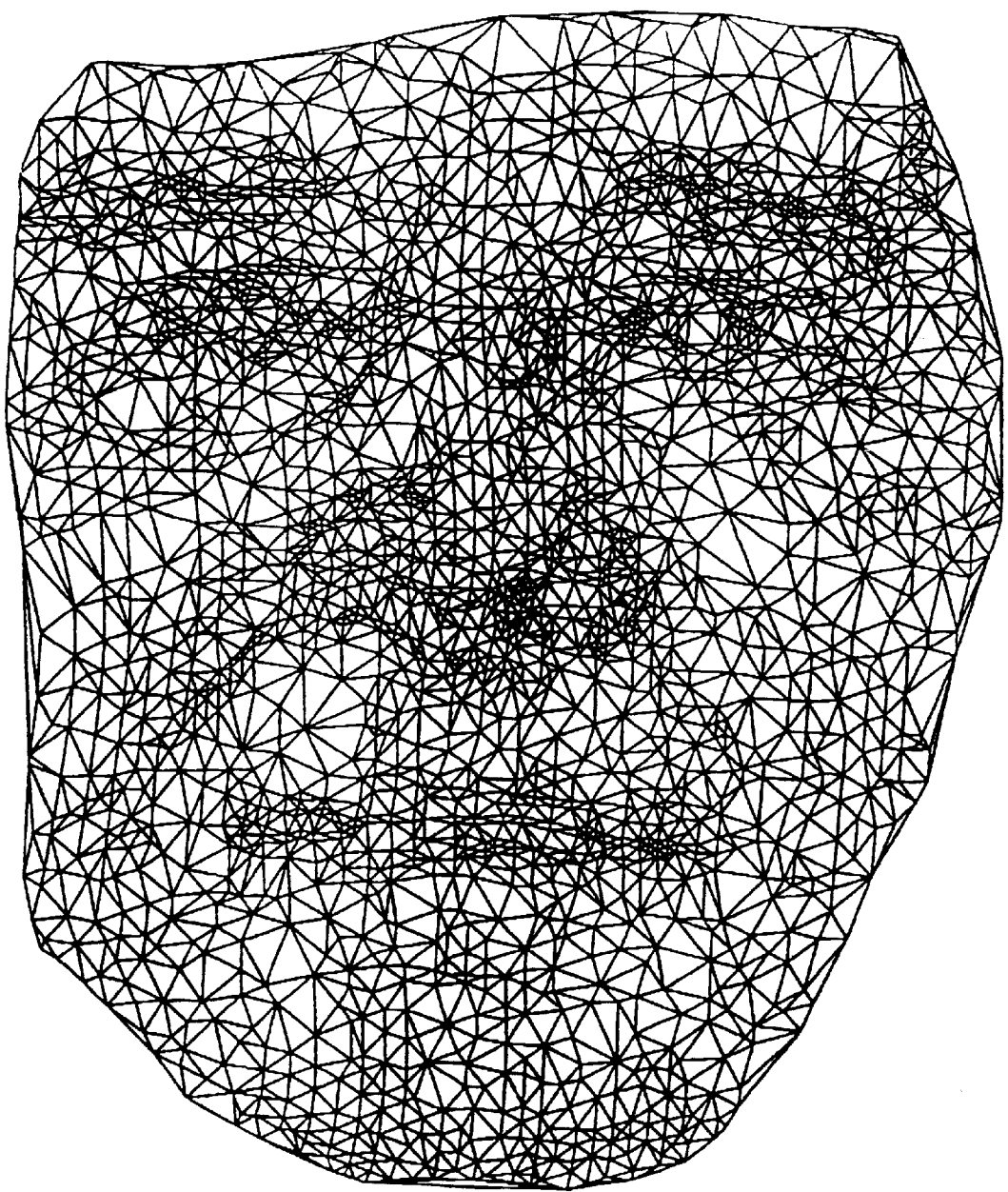
Figure 2F:
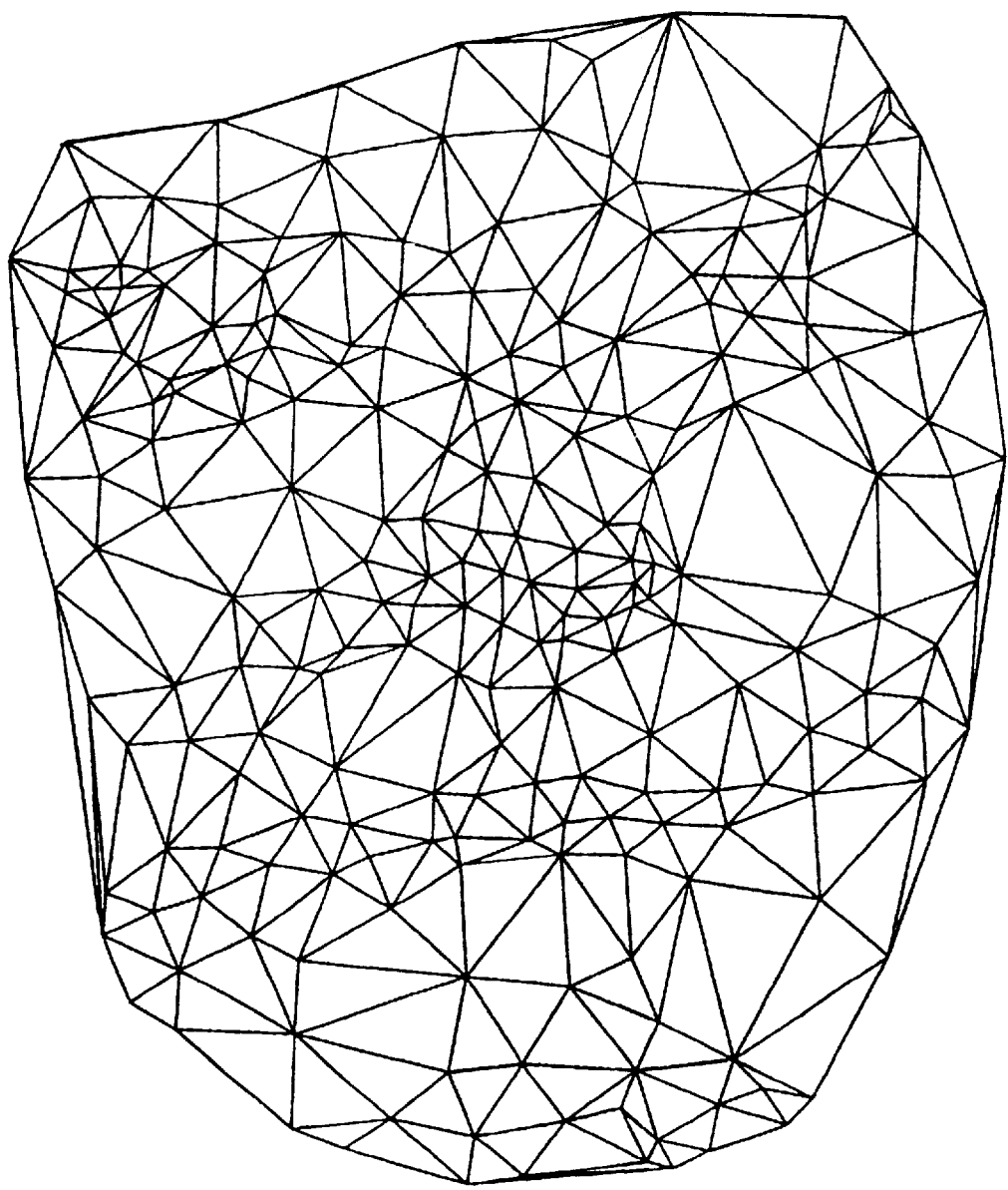

The present invention also permits rapid down resolution in mesh construction. Mesh 2e (depicted in FIG. 2e) provides a mesh of lower resolution than mesh 2d. Mesh 2f (depicted in FIG. 2f) returns the mesh to the low resolution quality, similar to mesh 2a. The present invention provides for rapid data point removal and deconstruction of triangulated detail following downward resolution. Because the present invention maintains a specific history of the additions and subtractions of points to and from the mesh and a rigid optimality checking sequence, the addition and deletion of the sequence of points can be monitored by the system and thus its history can be stored in a compact, coded sequence for rapid reversal and mesh regeneration.

In the exemplary embodiment, the system creates an irregular triangulated mesh as shown in FIG. 2b. The edges of the mesh faces, e.g., edges 4, 6 and 8 in mesh 2b to create faces, such as triangle 10. The vertices of any triangle, e.g., points 12, 14, and 16, are data points from the cloud of points 1 added through the incremental input of data points. Each triangle in the mesh, e.g., triangle 10, has a set of neighboring triangles, e.g., neighbors 18, 20, and 22. The faces, edges and vertices can be associated with other information concerning the object, such as normal data, texture map data and ambient light information. In this way, a mesh model can be used to output lifelike displays and other representations.

The embodiment of the system 3 employs a computer (not shown) comprising a central processing unit ("CPU" or "processor") to accept input data, manipulate the data, and create data structures related to the model building, programmed elements used by the processor, and one or more memories to house the data, data structures and program elements. The computer also typically includes a display device and input devices like a keyboard and a mouse. In an exemplary embodiment, the computer sold under the product name "Indy" and built by Silicon Graphics Incorporated is one computer that is suitable to implement the system of the present invention. For more information concerning the Silicon Graphics' Indy™ computer system, the reader is referred to information and references listed at the following website: http://www/sgi.com/products/indy. A set of programmed elements provides instructions the processor executes to perform the operations of the computer system 3. In the exemplary embodiment, programmed elements are written in the C++ programming language. For more information on the C++ programming language the reader is referred to the following publications which are expressly incorporated herein by reference: *The C++ Programming Language,* Bjarne Stroustrup, Addison Wesley Publishing Co., 1991; *C++ Inside & Out,* Bruce Eckel, Osborne McGraw-Hill, 1993.

ii. Optimal Simplification: Point Ordering to Establish and Preserve the Most Significant Details For rapid, dynamic resolution mesh generation, the computer systems of the present invention provides that the points be ordered by significance in describing the shape of the basic object, terrain or other surface. By ordering the random data points according to descriptive significance, the computer system fully approximates the basic contours of an object, terrain or other surface at a low resolution using relatively few selected points. The computer system 3 dynamically revises the initial mesh for increasingly higher resolution, and gives upward resolution, or "up res" capability, by adding the additional points. The computer system 3 maintains optimal simplification during "up res" additions as each next point added is the most important in terms of descriptive significance. The computer system 3 also supports dynamic downward resolution or "down res" capability through its technique of removing the most recently added points of less significant detail and reversing the sequence of mesh alterations by which the points were added. The computer system 3 maintains optimal simplification in the "down res" deleting of points.

Figure 3A:
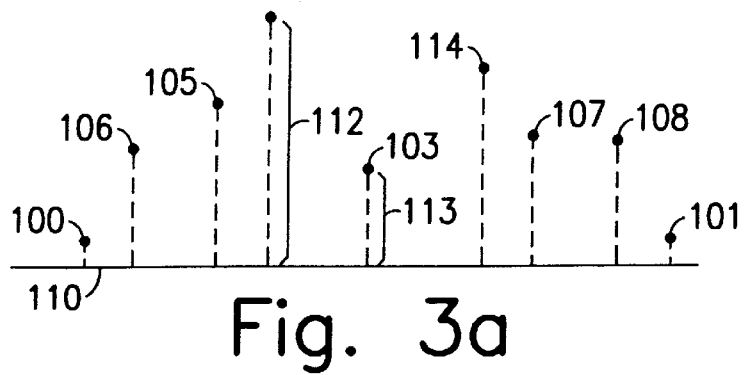
FIGS. 3a–h Depicts a 2D representation of a plurality of data points inserted into a mesh and deleted from it in the order of their descriptive significance.

FIGS. 3*a–h* depicts a 2D representation of a set of data points and their construction into a mesh structure by the ordering technique of the present invention. The principles also apply in 3D applications. Points 100, 101, 102, 103, 104, 105, 106, 107 and 108 represent a cloud of points, from which the present invention constructs meshes. A geometric object 110, such as plane, or sphere, provides an initial reference for determining significance. As shown in FIG. 3*a,* all of the points lie at different distances from the initial reference 110 (e.g. compare distance 112 with distance 113). To build mesh of the lowest resolution, the present invention locates a basic number of data points which are closest to the reference 110, (e.g. points 100, 101 and 103) and the farthest point from the reference (e.g. point 102).

Figure 3B:
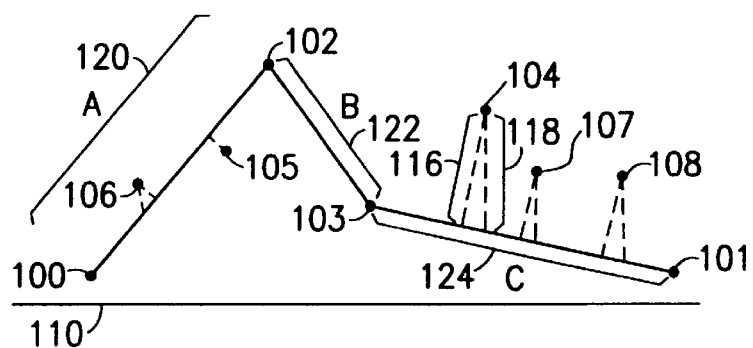

FIG. 3*b* shows the mesh built using the initial data points. Each of the segments depicted, (e.g. the segments between points 100 and 102) represent in 2D, a 3D face of a mesh. The points that have not yet been added to the mesh can be seen to relate to the surfaces. In FIG. 3*b*, points 106 and 105 relate to face A, 120, and points 104, 107 and 108 relate to face C, 124. No points relate to face B, 122. The distances that were previously computed for the points with regard to the initial plane 110 must now be recomputed to determine, for the remaining unmeshed points, their distances in relation to the newly created mesh. Those distances can be computed with respect to either a normal line to the relevant face (e.g. distance 116 for point 104) or with respect to a normal line to the reference plane 110 (e.g. distance 118 for point 104). After recalculating the distances for the points, the procedure then selects the point having the largest distance away from the mesh (e.g. point 104 in FIG. 3*b*). Point 104, now being most significant, is introduced into the mesh.

Figure 3C:
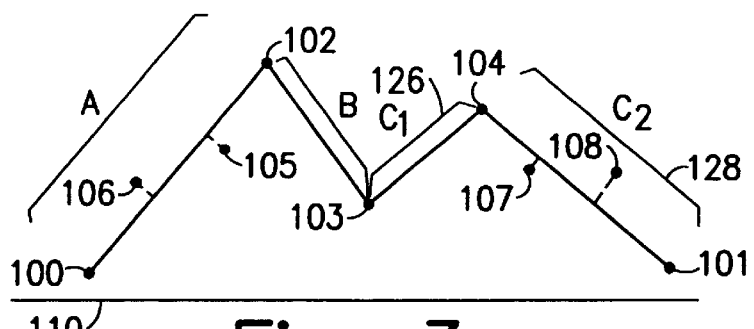

FIG. 3*c* depicts the resulting mesh after adding point 104. The mesh of FIG. 3*c* provides a general low resolution image of the surface and has changed the mesh from FIG. 3*b* only by altering face C, 124. As showning FIG. 3*c*, face C, 124 has changed into two faces, C1, 126 and C2, 128.

The addition of a new point, such as point 106, 105 or 107 adds more detail to the mesh. To make the addition, the procedure must again determine the distance each unmeshed point has with respect to the new mesh faces. For many of the unmeshed points, the distances need not be recomputed, because their distance with regard to the mesh surface has not changed (e.g. points 106 and 105). In FIG. 3*c* it would be necessary to recompute distances only for points 107 and 108, because the addition of point 104 into the mesh only caused a change to face C, 124. Upon recomputing, the procedure selects point 108 to be added to the mesh. Point 108 is the furthest point away from the mesh compared to points 105, 106 or 107. It is the most significant point to add in this configuration.

Figure 3D:
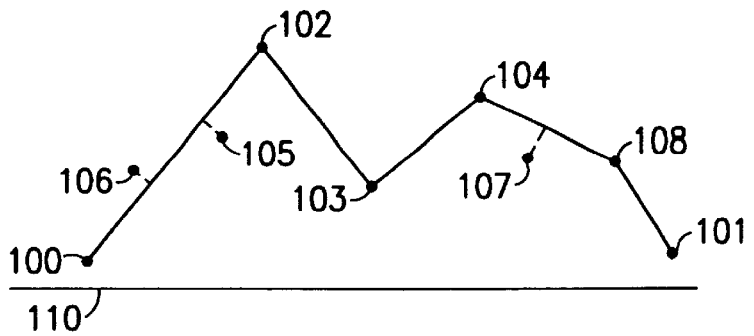
Figure 3E:
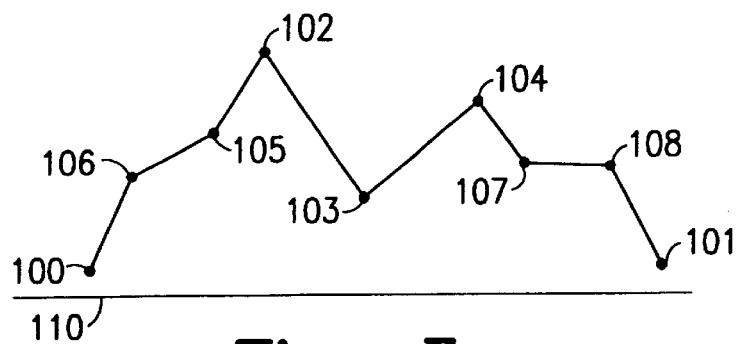

FIG. 3*d* depicts the mesh structure after the addition of point 108. The additional point provides a greater level of detail, and greater resolution, as compared to the mesh generated in FIG. 3*c*. The procedure continues adding points as described. The addition of point 108 into the mesh requires a recomputation of the distance point 107 has to the new mesh. Points 105 and 106 require no recomputation. In the next step, the system inserts point 107, point 106 and then point 105. FIG. 3*e* depicts a mesh configuration at full resolution, with each and every data point added.

Figure 3F:
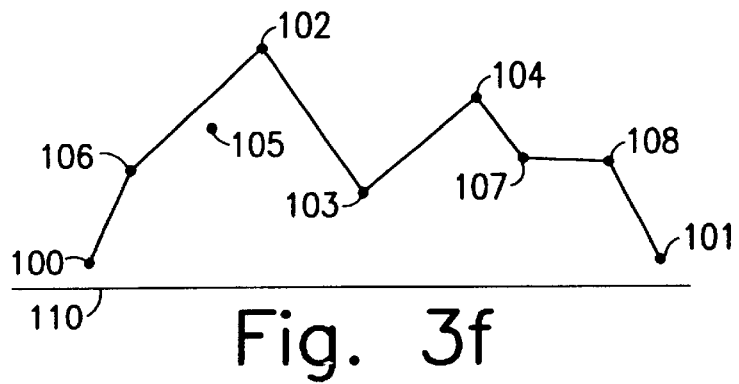
Figure 3G:
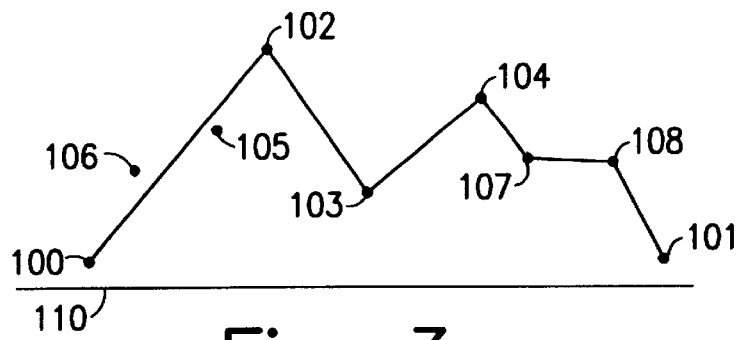
Figure 3H:
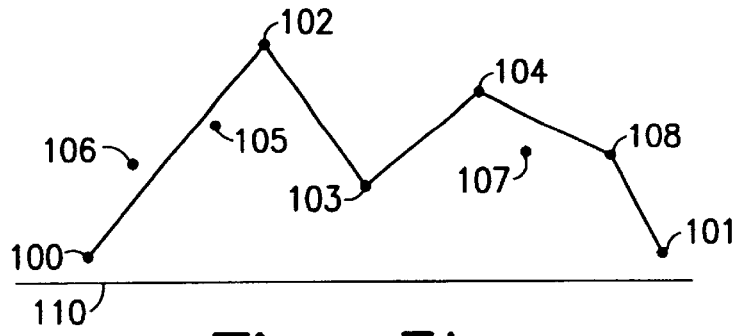

The present invention also achieves downward resolution capability through its system of ordered removal of points. Starting from the high-resolution mesh depicted in FIG. 3*e* the system rapidly removes points from the mesh in LIFO (last in first out) order thereby retaining the most significant details in the mesh. As described below, the system provides the capability of storing information concerning the order in which the points were added and storing information concerning the changes that took place to build the mesh. FIG. 3*f* shows the mesh after removal of the last point previously added, point 105. FIG. 3*g* shows the mesh after removal of point 106. FIG. 3*h* shows the mesh configuration after the removal of point 107.

Apart from the up/down resolution capability, the ordering system of the present invention further enables the user to pinpoint a level of detail for the mesh by selecting a tolerance in terms of mesh point distance. When a user specifies a tolerance (e.g., tolerance=one millimeter) the procedure operates to create a mesh which would include all those points whose distance to the mesh was greater than the set tolerance. All remaining points would be left out of the mesh, because those points represent details more refined than the specified tolerance. This ability to specify tolerances permits less detailed meshes to be created for systems such as the Internet. On the Internet, an initial mesh could be transmitted at a given tolerance and then, later, additional points could be added as necessary to "up res" the quality of the mesh.

iii. Process Flows and Data Structures

Figure 4:
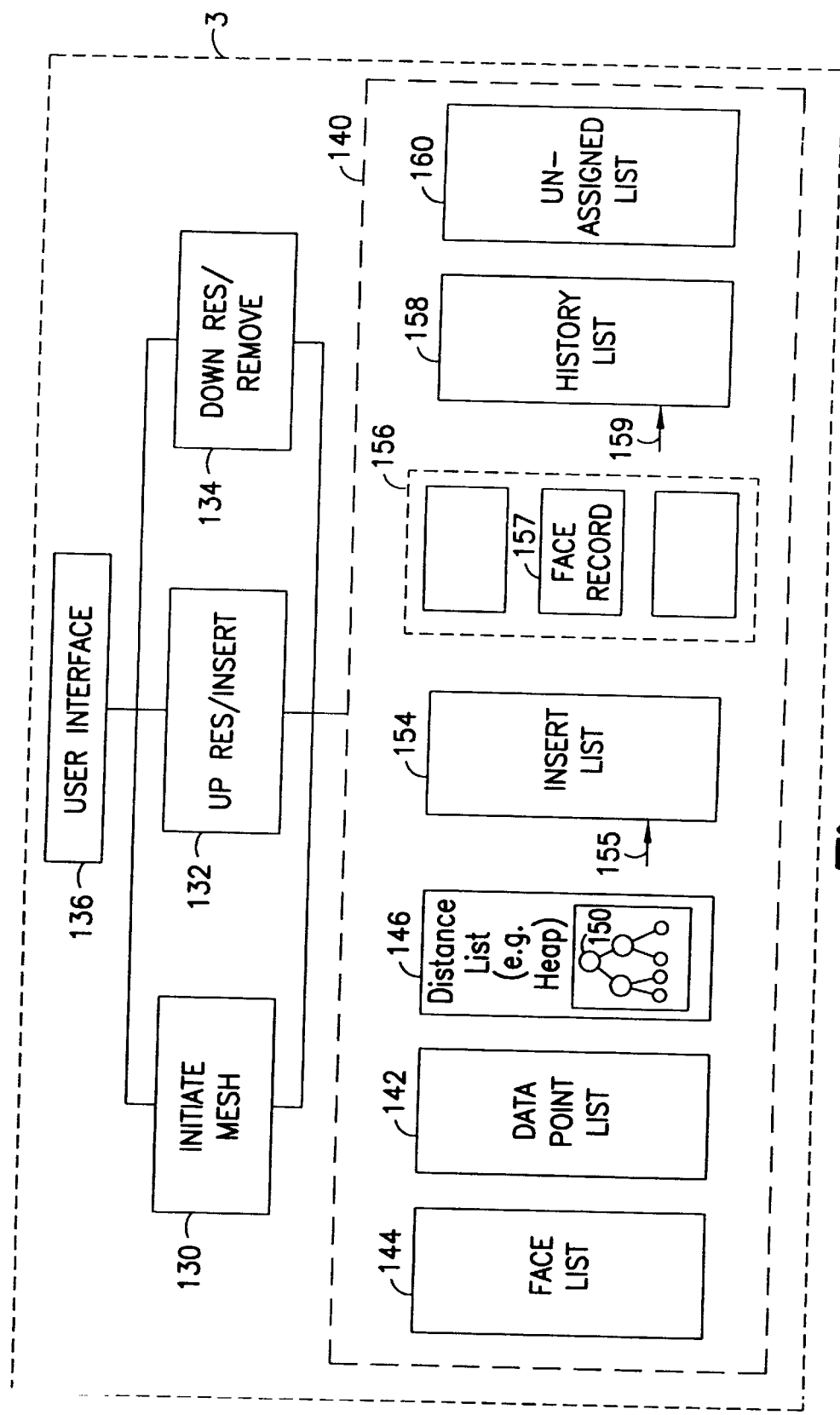
FIG. 4 Depicts an overview of basic programmed elements and data structures used to implement an exemplary meshing system with up res/down res capabilities.

FIG. 4 depicts an overview of basic programmed elements and data structures used to implement an exemplary meshing system with dynamic resolution, up res/down res capabilities, such as the computer system 3. An initiate mesh function 130 executes procedures to establish an initial mesh based on an initial reference object (e.g., a sphere, plane or other mathematically describable form). After establishing the initial mesh, an up res/insert function 132 enables points to be incrementally inserted into the mesh following the optimal simplification technique of the present invention. The up res/insert function 132 also tracks the history of the insertions and maintains the optimal quality characteristics of the mesh. The down res/remove point function 134 permits removal of the points following the same technique. A user control function 136 provides a user interface and allows the selection of a set of options, such as a meshing detail gradient toggle function (which permits the user to incrementally add or delete data points) or a specific tolerance meshing function.

Each of the basic programmed elements 130, 132 and 134 will access one or more of a set of data structures 140 as described in further detail below. In the exemplary embodiment depicted in FIG. 4, a data point list 142 contains the 3D X,Y,Z values for each of the input data points such as the cloud of points 1 depicted in FIG. 1. In the exemplary embodiment, the data point list 142 can be a dynamically allocated array set to the number of data points input through user control or other input, such as by a scanning process. As the distance calculations and insertions for the unmeshed points are made in relation to particular faces of the mesh, a face list 144 contains the current face to which an unmeshed point is associated. In the exemplary embodiment, the face list 144 is a dynamically allocated array with links, such as pointers, to the vertex entries in the data point list 142.

A distance list 146 contains the calculated distance of each unmeshed data point from its relevant face on the existing mesh. When a point is entered into the mesh, the distance value for the point is set to 0 (or its entry can be deleted from the list). In the exemplary embodiment, each entry in the distance list 146 is linked by a pointer to an entry in the data point list 142, which enables each distance to be associated to a specific unmeshed point. As the system of the present invention inserts points according to the optimal simplification technique, the system organizes the entries in the distance list 146 by a technique that returns the point having the largest distance from its face. The computer science technique of "heaping" is one such organizational system suitable for storing distance values and returning the largest distance values. A heap organizes a list into a tree structure where each parent node has a distance value that is larger than each of its children. The tree structure for the distance list 146 is depicted in FIG. 4. The processor places the largest distance value at the top of the tree structure (e.g., position 150) along with a pointer to its vertex on the data point list 142.

When the system adds a data point to the mesh, it places a reference to that data point on an insertion list 154. In the exemplary embodiment, the insertion list 154 is a stack array configured as a LIFO ordered stack. The system adds pointers that refer to the data points on the data point X,Y,Z coordinates list 142. List pointer 155 tracks the stack entries and shows where the next open slot appears.

A mesh data structure 156 maintains information for each face, its vertices, edges and neighboring faces. The mesh data structure 156 contains a plurality of face records (e.g., 157) which contains information concerning each geometric mesh face. The set of face records together form the data structure for the mesh model. In an exemplary embodiment, the system represents a face record in a triangulated mesh as follows:

| Record: "FACE" | |
| --- | --- |
| NEIGHBORS: | Neighbor #0, Neighbor #1, Neighbor #2 (Array of 3 pointers to other FACE records) |

| -continued | |
| --- | --- |
| Record: "FACE" | |
| VERTICES: | Vertex #0, Vertex #1, Vertex #2 (Array of 3 pointers to vertices on data point list 142) |
| FLAGS | Integral numbers specifying properties of a face such as its position on a triangulation |
| INDICES | (e.g., to associate unmeshed points on face list 144 with this face) |

The data element NEIGHBORS consists of an array of three pointers, each pointing to a FACE record for a neighboring (adjacent) face in the mesh. The data element VERTICES is an array of pointers that references data points in the data point list 142.

Figure 5:
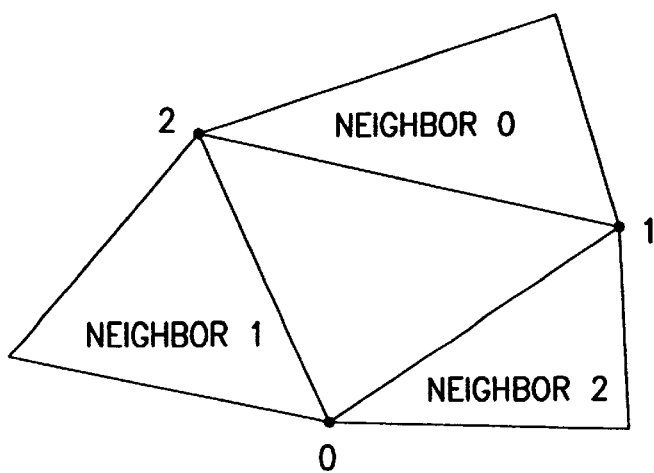
FIG. 5 Depicts an exemplary ordering of points of a mesh face and shows the relationship of those points to neighboring faces according to the present invention.

The system stores data concerning each face in a manner organized according to the teachings of the present invention In an exemplary embodiment, as shown by the triangle in FIG. 5, the system orders the points of a triangle in a countercloclwise sequence, 0, 1 and 2. It is understood that the vertices could also be numbered in clockwise order or ordered by another fixed ordering system. The system orders the neighboring triangles following the sequence of ordered vertices. The system indexes neighbor #0 to be directly opposite vertex 0. Neighbor #1 is directly opposite vertex #1. Neighbor #2 is directly opposite vertex #2. As is described below, the present invention provides a system to maintain this ordering while maintaining the optimality of the triangles in the mesh. When a point is inserted into the mesh, the system generates new face records for the mesh data structure and redetermines (where necessary) the distance relationships between the unmeshed points and the existing mesh. On point insertion, the mesh can require reconfiguration within the general neighborhood of faces around the inserted point to maintain optimality. This system uses the ordering of the vertices and neighbors (as is described in further detail below) to complete the needed mesh reconfigurations.

Consequently, when a new point is inserted, the neighborhood of faces around the addition must be checked for optimality and reconfigured if necessary. Referring again to FIG. 4, a history list 158 provides a data structure which is used to track the changes executed by the system when reconfiguring the mesh to an optimal state. The present invention uses the history list 158 in conjunction with the insertion list 154 to then perform dynamic up/down resolution point insertions and deletions. When the system adds a new point to the mesh, it also adds a reference on the point insertion list 154. After the point is inserted, the processor checks the configuration for optimality and adds a reference for each checking step on the history list 158. The history list 158 in the exemplary embodiment comprises a stack structure in which the indications of checks and changes are added in LIFO (last in first out) order, just like the ordering of points on the insertion list 154. Because the system checks for optimality in a regularized way, the system can track all insertions. The system can then delete points simply by following in reverse the stacks of the history list 158 and the insertion list 154. The system can also regenerate meshes of more detail by following the sequences of point insertions and reconfigurations already indicated on the insertion list 154 and the history list 158. To perform extremely rapid up/down resolution mesh generations, the system will first build a history list and point insertion list to full resolution and then simply use those lists to regenerate meshes to any level of detail, such as a user-specified tolerance.

As points are added to the mesh or taken away from it, the faces of the mesh change (as was seen above in FIGS. 3a–h).

As those faces are changed the distances of points associated with the altered face also change, sometimes dramatically. (For example, in FIGS. 3b and 3c, the distance that point 107 had in relation to the mesh surface changed dramatically when point 104 was inserted.) When alterations occur, new distances must be recalculated for the data points whose associated faces become altered. The system maintains a list of references to the unmeshed points involved on an unassigned list 160 as explained further below. In an exemplary embodiment, the unassigned list operates as a dynamically allocated array containing pointers to entries in the data point list 142.

The data structures 140 described above are used with the basic program elements to perform system functions. It is understood that the data structures 140 are exemplary, the teachings of the present invention can also be implemented using other data structure configurations. In addition to the elements described above, there are also a number of task performing subroutines and functions which are described below.

iv. Mesh Initiation

Figure 6:
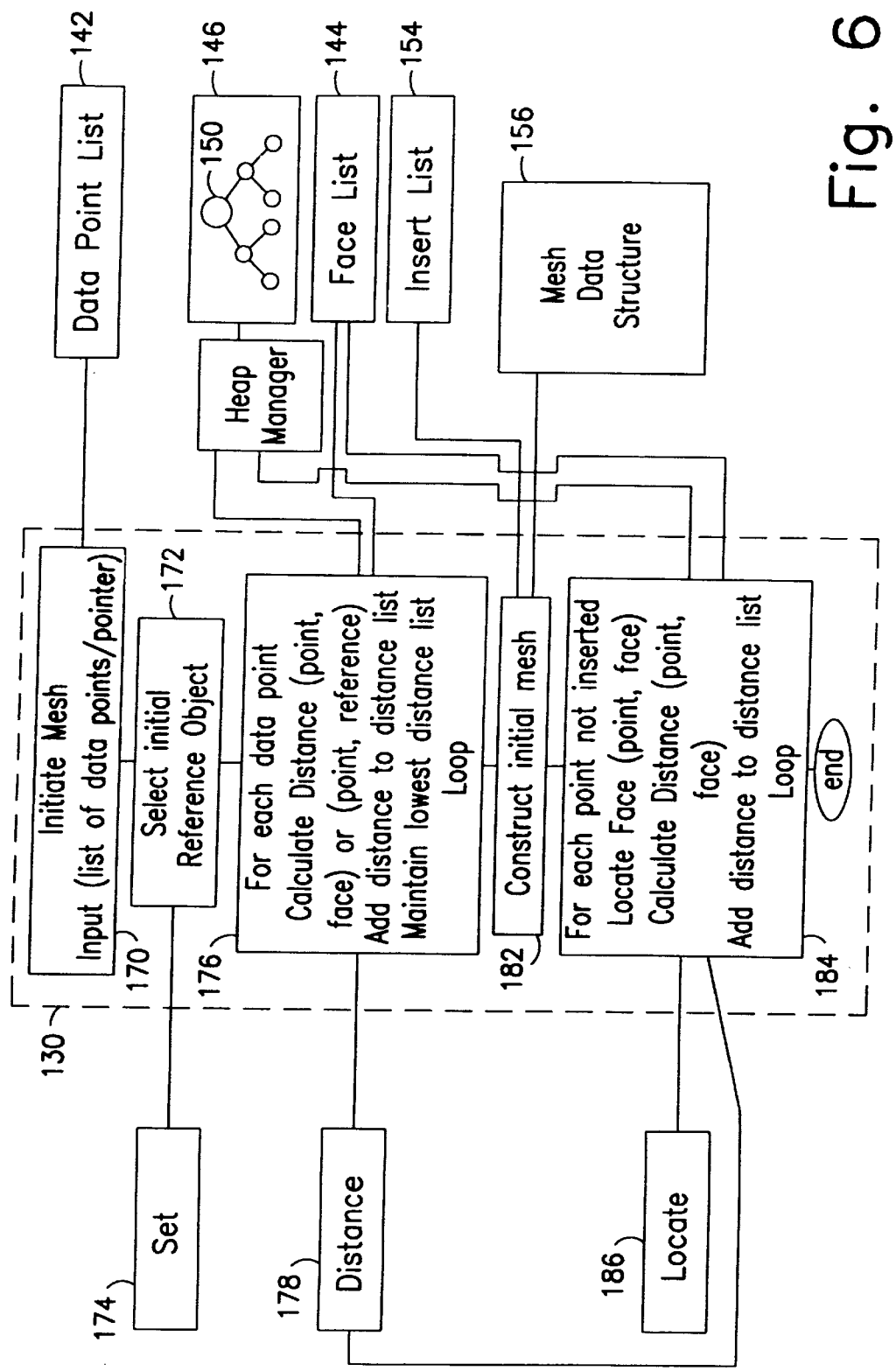
FIG. 6 Depicts an exemplary process flow for the initiate mesh function of the present invention.

FIG. 6 sets forth an exemplary process flow for the initiate mesh function 130 of FIG. 4. Step 170 sets forth the data input for the function, which is the data point list 142 or some other device giving access to that list, like a pointer. In step 172, the processor operates to determine an initial reference object that the system will use to build the mesh from the cloud of data points 1 (now listed in the data point list 142). A user may wish to mesh in reference to different geometric objects. For example, the user may wish to mesh a set of data points for top down view of a topographical surface or one side of a person's head with reference to a plane. However, on other occasions the set of data points may represent data points from both a front side and back side of an object (or all sides) and for those point clouds a user may wish to build meshes with reference to a sphere.

In FIG. 6 a set function 174 permits a user to select an initial reference object and determine its location with reference to the plurality of data points. For a planar reference object a user can select an equation for a plane that exists above, below or within the plurality of data points depending on user preference. For a spherical reference object the user typically will select arlequation for a unit sphere at a center point location within a center of mass for the cloud of points. Many different techniques are currently available and can be used to implement the functions of the set function 174. For example, the set function can determine the equation for a planar reference object by a minimum sum of squares method. For a spherical reference object, the set function 174 can determine the sphere location by a fitting function which determines center of mass. In an exemplary embodiment, the user executes the set function 174 in a preprocessing step, such that during the mesh initiation process 130 the equation of the reference object and its shape is already determined. In such an embodiment, the set function 174 returns the predetermined values to step 172.

After obtaining a basic reference object, such as a unit sphere, the processor begins a loop in step 176 to calculate the distance each point has from the reference object and place each distance on the distance list 146. To calculate the distance for a point, the processor in step 176 calls a distance function 178 to calculate a distance, such as the normal distance (in the case of a plane) or (in the case of a sphere) the distance to its center point. The distance function 178 returns a numerical distance value. In step 176, the processor adds the returned numerical distance value in reference to the data point onto the distance list 146. A heap manager 180 provides a set of program instructions to maintain the distance list 146 in a heap format which always returns a pointer to the vertex having the largest distance value. In the mesh initiation procedure, the system will also maintain a list of the data points having the lowest distance values as well (not shown).

In step 182 (FIG. 6), the system proceeds to construct an initial mesh. The system can be configured in many different ways to construct an initial mesh. According to the teachings of the present invention, any initial 3 or 4 points can be used to construct the initial mesh. Even randomly selected points are suitable. The teachings of the present invention show that after initial mesh construction an incremental addition of 10–50 points (depending on the object) with optimal simplification point ordering will provide sufficient detail to render a low resolution model. Depending on the user selected reference object (e.g., plane or sphere) the computer creates an initial triangulation in the form of either a square (constructed from two triangles) or a tetrahedron (constructed from four triangles). A square is used for planar triangulations, tetrahedrons are used for spherical triangulations. Alternatively, when the plane is the reference object, the single triangle can be used as an initial triangulation. Although the system described can use any three or four points, in an exemplary embodiment for a planar reference object, the system selects the three or four points that are found to be closest in distance to the plane. A selection of points which lie closest to the plane and bound the largest space projected on that plane is also a suitable criteria. For a spherical reference object, an exemplary embodiment selects four data points which most closely determine a tetrahedron of equilateral triangles. The first three selected points create a triangle, which will be the first face of the mesh. The system creates a face 1 record and sets vertices #0, #1 and #2 to pointers which reference the X,Y,Z coordinates on the data point list 142. The distances for those points are now removed from the distance list 146 by the heap manager 180. On the face list 144, the system creates entries for the data points which reference the face 1 record.

Figure 7A:
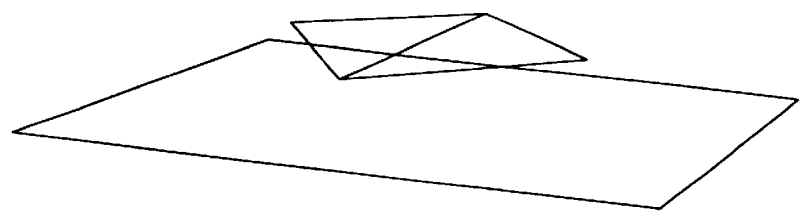
FIG. 7a Depicts an initial triangle mesh configuration made with reference to a plane.
Figure 7B:
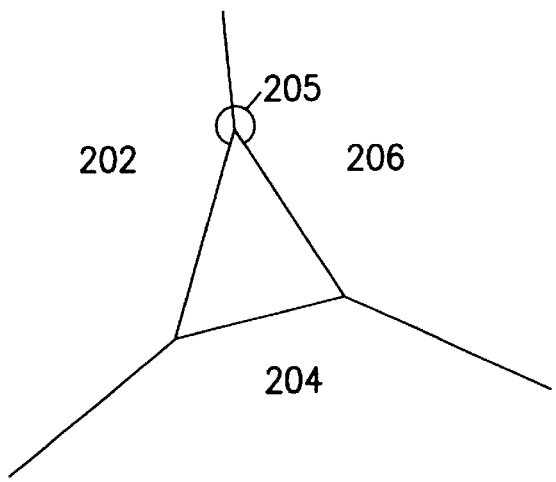
FIG. 7b Depicts an initial mesh configuration made with reference to a plane.

FIG. 7a shows the two triangle initial mesh with a planar reference object. In an alternative environment, the planar space could be initially triangulated by just one triangle (as shown in FIG. 7b). For the initial faces the system will also create neighbor face links. In both FIGS. 7a and 7b there is a region outside the boundary of the triangle region into which data points may be inserted. The present invention provides that the regions can be divided into null neighbor regions. For example in FIG. 7b the present invention divides the unbounded region into three null neighbor areas 202, 204 and 206. The system divides the null neighbor regions by a line which bisects the angle formed at each edge vertex (e.g., angle 205). Each null neighbor region forms a plane determined by the two points of the mesh edge and a third point set at an infinite value. The system uses this null neighbor planar equation in computing distances for the unmeshed points (as is described in further detail below).

Figure 7C:
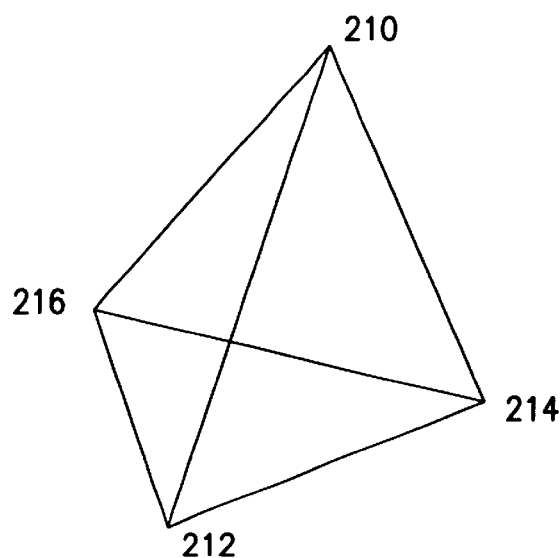
FIG. 7c Depicts an initial mesh configuration made with reference to a sphere.

If the initial reference is a sphere, FIG. 7c shows that the initial mesh constructed takes the form of a tetrahedron. In such a case, the mesh construction step of 182 (FIG. 6) creates a mesh with four faces using the four data points (e.g., 210, 212, 214 and 216) which best approximates a tetrahedron. With the tetrahedron, each triangular face has as its neighbors the tetrahedron's other triangles. With the tetrahedron, it is not necessary to designate null neighbor regions as was the case with the planar triangulation determined above.

For each face record in either the planar or spherical example, the system orders the vertices and neighbors according to the counterclockwise structure described above with reference to FIG. 5. The processor in step 182 also checks the initial configuration for the Delaunay criteria and reorganizes the face edges as necessary.

After the initial mesh is constructed, the processor begins a loop in step 184 (FIG. 6) to recompute all distances for the unmeshed points in relation to the new initial mesh. This process involves two basic steps. First, the processor must determine a specific face with which to associate the point. Second, the processor must calculate the distance that the data point has in reference to that face.

For any given point, the processor attempts to find the face that is closest to it. A locate function 186 provides a pointer or other reference to the face that will be related to the unmeshed data point and used for distance calculations. In an exemplary embodiment, the face returned has the shortest normal distance to the data point. In an alternative embodiment, the face can be determined with reference to the shortest line from the reference object to the point which intersects the face and the point. When the initial reference object is a plane the locate function also will handle the special case when an unmeshed data point lies in a null neighbor region.

Figure 8B:
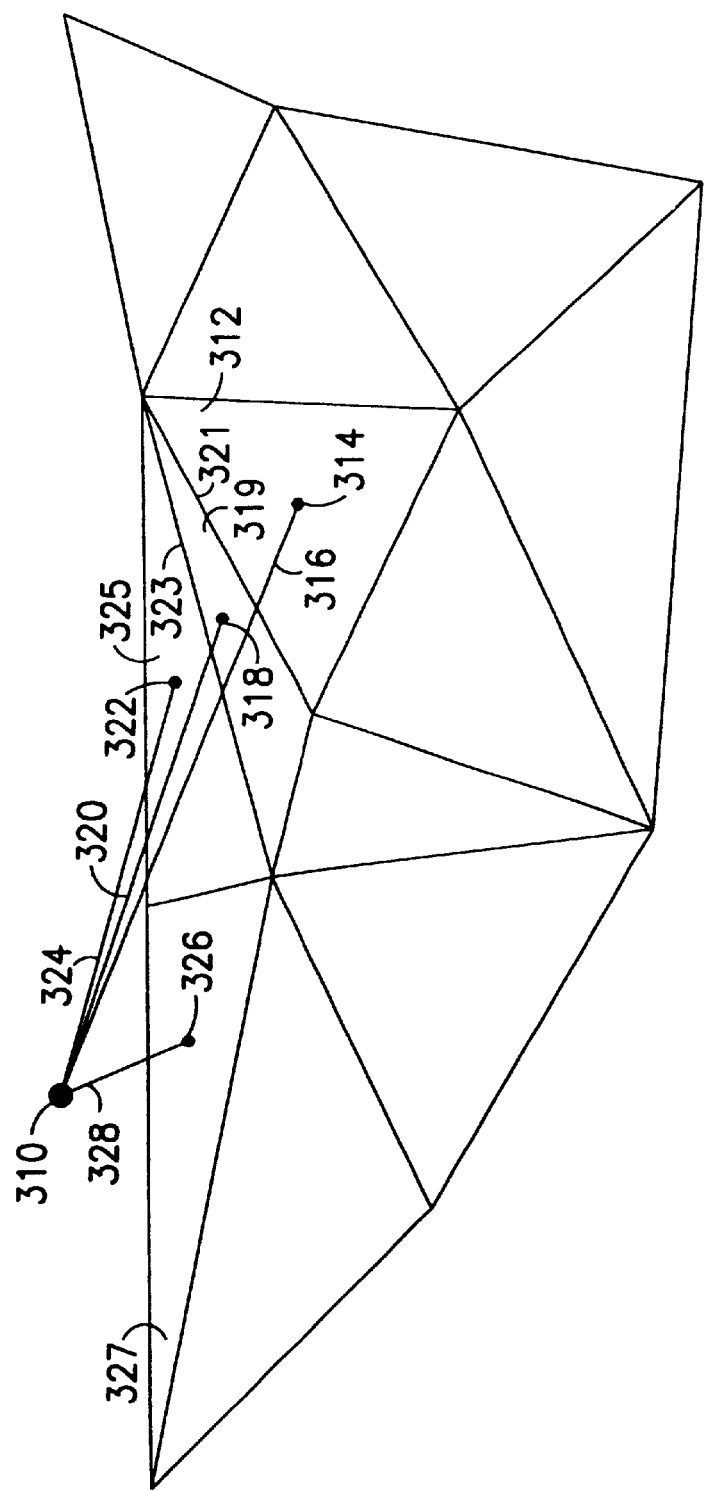
FIG. 8b Depicts an exemplary process of locating a face with which an unmeshed point can be associated.
Figure 8A:
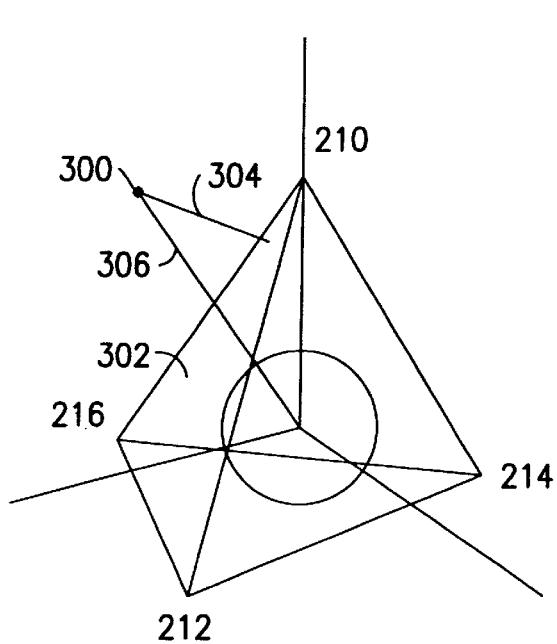
FIG. 8a Depicts a point and its shortest distance relationship between the point and the face of the mesh.

FIG. 8a depicts a point 300 and the distance relationships between it and face 302, as determined by a normal line 304 or, alternatively intersection line 306 from the reference object.

For purposes of implementing the present invention many different procedures are suitable for determining the face of insertion. In the exemplary embodiment, the face location process in step 186 (FIG. 6) is determined based on proximity to the last acted upon face. The described system searches quickly by traversing a direct line of faces between that face and the point to be inserted to locate a face for distance calculation.

Figure 9:
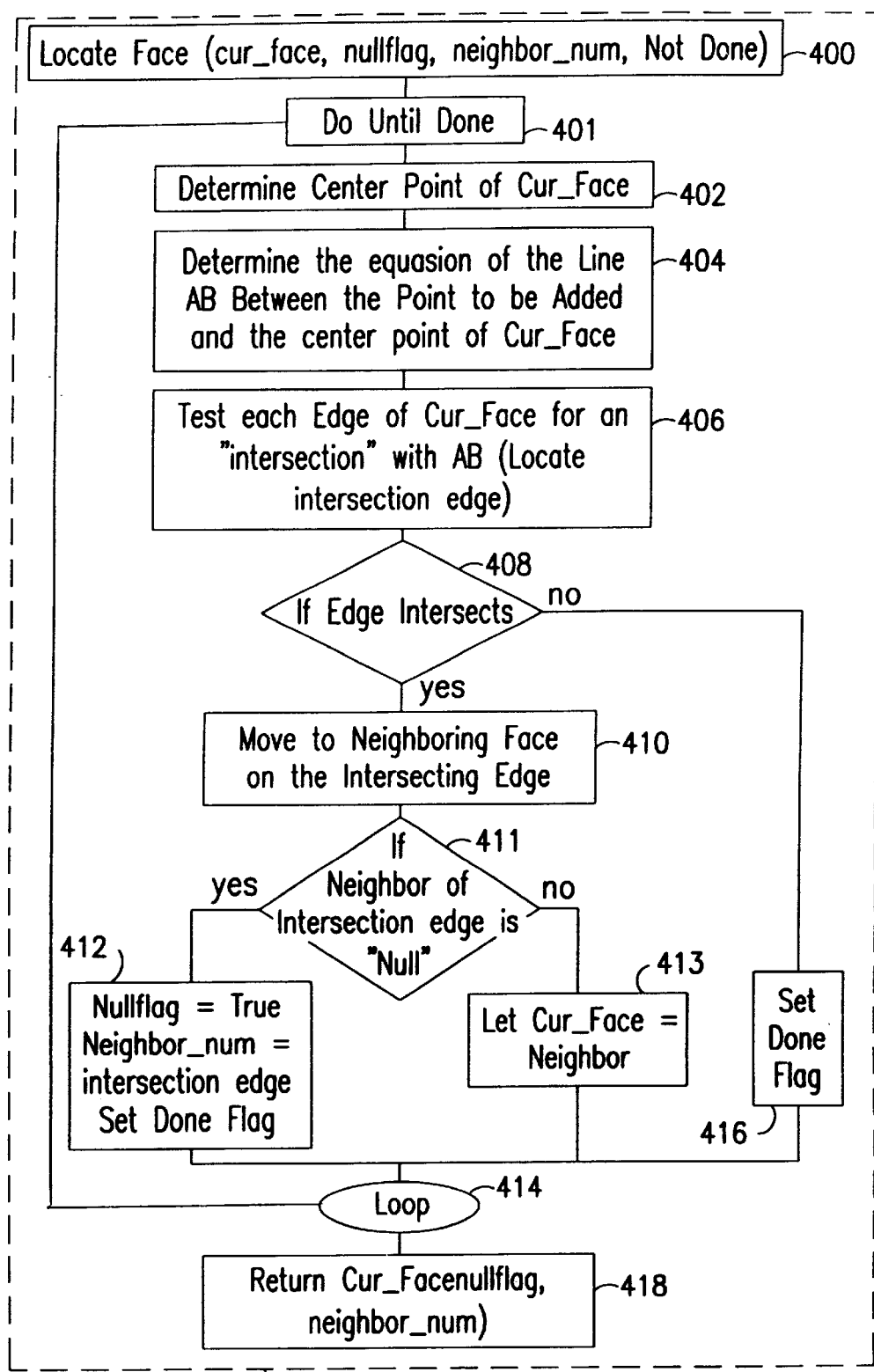
FIG. 9 Depicts an exemplary process flow for determining the mesh face with which an unmeshed point will be associated.

FIG. 9 depicts an exemplary process flow of locate function 186. In discussion of the exemplary process flow, the reader is also referred to FIG. 8b which depicts a representation of the mesh and shows how the face is located.

Referring to FIG. 9, the process flow begins in step 400 where the input is a pointer reference to the last face examined by the system. That face is set to the "current face" and a loop begins in step 401 to determine whether the point to be added lies in that face. Referring to FIG. 8b, point 310 is the point to be added and the last face, triangle 312, is set to now be current face.

Referring to FIG. 9 the processor proceeds in step 402 to locate the center point of the current face (point 314 in FIG. 8b). In step 404 (FIG. 9), the procedure determines an equation for the line between points to be added (e.g., 310, FIG. 8b) and the center point of the triangle (e.g., 314). The line can be referred to as AB.

In step 406 of FIG. 6b, the procedure then tests each edge of the current face (e.g., triangle 312, FIG. 8b) to determine whether the line AB will "intersect" one of the edges (i.e., cross one of the bounds of an edge of that triangle). The processor determines that intersection by projecting the mesh configuration and the AB line onto the reference object and determining whether an intersection occurs. In FIG. 8b, the line AB intersects edge 321 of triangle 312.

Referring to FIG. 9, step 408 provides that if there is an intersecting edge in the current triangle, the procedure will move to step 410 and examine the neighboring triangle that is adjacent to the intersecting edge. In FIG. 8b the neighboring triangle is triangle 319. However, in step 411 (FIG. 9) if the edge is "NULL" the procedure must take steps to handle that special case (which occurs when the surface is modeled in reference to a place instead of a sphere). In step 412 the processor sets a null neighbor flag to indicate that the new point will not be inserted into an existing triangle. As the current face remains the closest triangle (even though the next point will not be inserted into it), the processor will also store the information about the triangle and set a DONE flag. If, in step 411, the neighbor is not "NULL" the processor simply resets the current face to be the neighbor in step 413. The process set forth in FIG. 9 continues in step 414 to loop and return to step 401 and perform the same checking procedure for the new triangle.

Referring to FIG. 8b the procedure continues checking in a typical case by locating center point 318 of triangle 319. The line AB is now drawn between points 310 and 318. The procedure checks the edges of triangle 319 and finds an intersecting edge 323. The procedure moves to neighboring triangle 325. In that triangle, the AB line defined by center point 322 and 310 also intersects an edge. The process then continues to triangle 327, which is now the current face. For triangle 327, there is no edge which intersects between the line between center point 326 and point 310 (line 328). Referring again to FIG. 9, the result causes the processor to set a DONE flag in step 416 and exit the loop. In step 418, the processor returns a pointer to the found triangular face (or the special flags and pointers for the "NULL" case when a plane is the initial reference object as noted above).

Returning to FIG. 6, when a face is located for the point, the processor alters the slot on face list 144 for the data point so that it contains a reference to the newly associated face. Then the processor proceeds to calculate the distance between the point and the face. The distance function 178 (described above) performs this function and return the distance value. If the point is located in a null neighbor region (e.g., the null flag is true), the processor calculates the closest distance the data point has to the associated nearest neighbor face on the mesh. The processor then adds the calculated distance value for the data point on the distance list 146 using the heap manager 180. The processor also adds for the data point a reference to the closest face (plus an indication of whether the point lies in a null neighbor region) on the face list 144.

The point processing continues in step 184 until the processor assigns all unmeshed points to a face (with an indication made for null neighbor regions) and calculates a distance value for them. The heap structure now has at position 150 a reference to the point of most significant detail. The mesh is now ready for up resolution point insertion.

V. Incremental Insertion of Data Points

Figure 10:
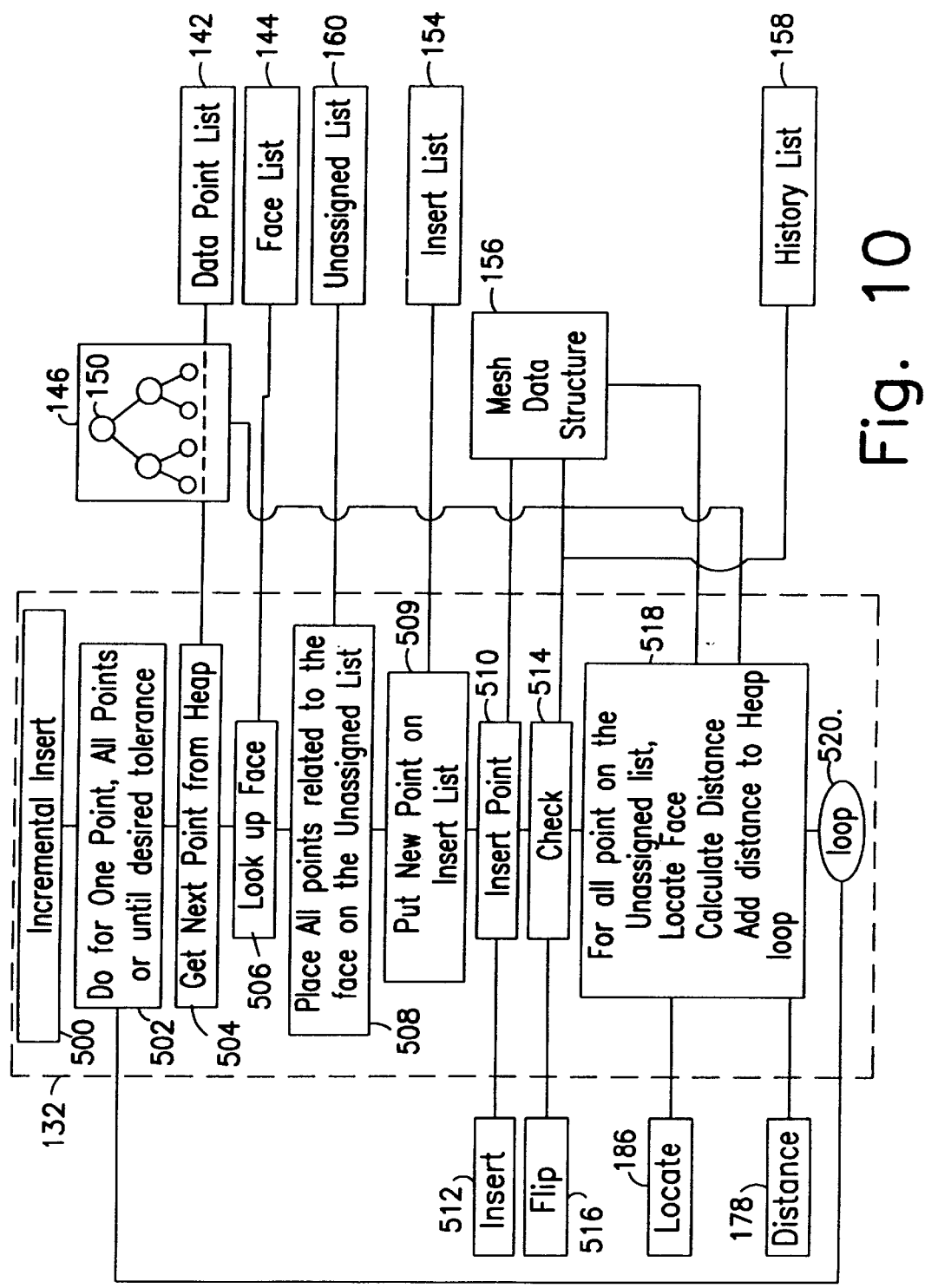
FIG. 10 Depicts an exemplary process flow for incremental insertion of one or more points by the up res/insert procedure of the present invention.

FIG. 10 depicts an exemplary process flow for an incremental insertion of one or more of the remaining unmeshed points by the up res/insert procedure 132. Step 502 begins a loop which permits processing of, for example, one data point, all of the remaining unmeshed data points, or a set of data points up to a user set distance tolerance. In step 504, processing begins by obtaining from the distance list 146 the point with the largest distance. As seen above, that distance entry provides a reference to the X,Y,Z coordinate values in data point list 142 for that point. In the exemplary embodiment, the processor reads this point value, (using the heap manager 180) removes the point's distance value from the heap (or nullifies it to zero) and reconfigures the heap. For the given point, the procedure in step 506 next accesses the face list 144 to locate its corresponding face. The point will be inserted into this face, and that insertion causes the processor to make a number of adjustments to the mesh.

For one adjustment, insertion of a point into a face necessitates readjustment of all other unmeshed points that were related to the face. Their distances to the mesh face must be recalculated. In step 508, the processor places pointers to those points on the unassigned list 160. (Later, if additional adjustments must be made in checking for optimization, the unmeshed points related to those other faces are also added to the list.) Once the processor identifies the face for point insertion and provides for the unmeshed points related to it, the processor proceeds in step 509 to place a reference to the data point on the insert list 154 and moves in step 510 to insert the next point into the mesh. The addition of the new point splits the current triangle into three new triangles. An insert function 512 splits the selected mesh face and reorganizes the points and edges to create new face records. As stated above, the vertices and neighbor are ordered by a specific and predetermined numbering system.

Figure 11:
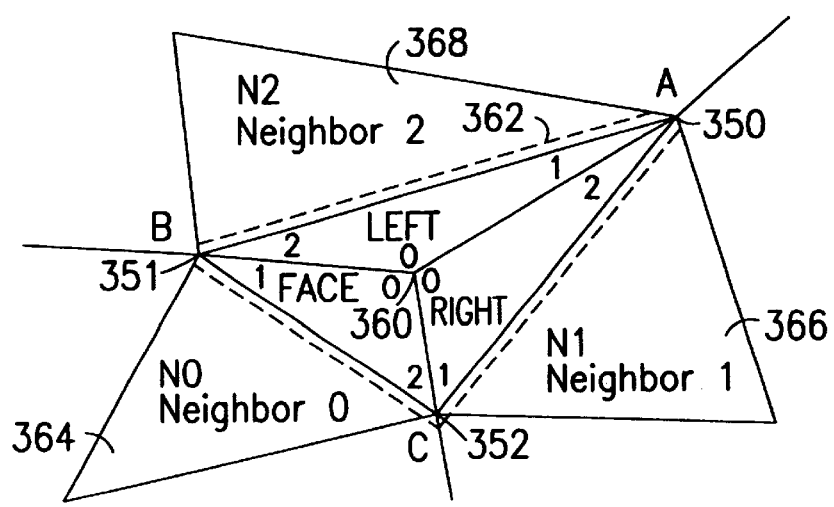
FIG. 11 Depicts the reorganizing of the relationship of vertices and neighbors of mesh faces when inserting a new point into a mesh.

FIG. 11 depicts an addition of point 360 to triangular face 362 ("FACE") and shows the alteration of the face, vertices and neighbor relationships that the addition requires. Before the addition of point 360, triangle 362 with vertex points A, B and C (points 350, 351 and 352 ordered counterclockwise) carried the following relationships in its face data structure record:

| Record: "FACE" (Triangle 362) | |
|---|---|
| NEIGHBORS: | Neighbor 0 (Triangle 364), Neighbor 1 (Triangle 366), Neighbor 2 (Triangle 368) |
| VERTICES: | V0 (point 350), V1 (point 351), V2 (point 352) |

Adding point 360 requires changes to the data structure links. The addition creates two additional faces: a RIGHT face (with vertices 360, 350, 352) and a LEFT face (with vertices 360, 350 and 351).

The original triangle "FACE" no longer has as its Vertex 0 at point 350. The processor sets vertex 0 for FACE to point 360. The new, smaller triangle has as vertices points 360, 351 and 352. The links to Neighbor 1 (triangle 366) and Neighbor 2 (triangle 360) also must be changed, because these triangles are no longer neighbors FACE. The process will first change FACE's neighbor link from "Neighbor 2" to "LEFT". The processor will also change FACE's from "Neighbor 1" to "RIGHT." The data structure for the revised FACE will appear as follows:

| Record: "FACE" | |
|---|---|
| NEIGHBORS: | Neighbor 0, RIGHT, LEFT |
| VERTICES: | V0 (new point 360), V1 (point 351), V2 (point 352) |

The system creates new faces records, RIGHT and LEFT, as follows:

| Record: "RIGHT" | |
|---|---|
| NEIGHBORS: | Neighbor 1, LEFT, FACE |
| VERTICES: | V0 (new point 360), V1 (point 352), V2 (point 350) |

| Record: "LEFT" | |
|---|---|
| NEIGHBORS: | Neighbor 2, FACE, RIGHT |
| VERTICES: | V0 (new point 360), V1 (point 350), V2 (point 351) |

The processor also replaces Neighbor 1 (triangle 366)'s neighbor link to FACE with a link to RIGHT. The processor finds the link to FACE by searching each of NEIGHBOR 1's neighbor links until it finds the one that points to FACE. The processor replaces Neighbor 2 (triangle 368)'s neighbor link to FACE with a link to LEFT in the same manner.

This configuration has particular advantages, because it guarantees that the new vertex is always V0 for each face. Also, since each vertex corresponds to an opposite edge and neighbor, the ordering creates a way to check the configuration for optimality in a regularized way. First, the neighbor that will be checked for optimality will always be the side involving neighbor 0. Furthermore, the indexing system guarantees that, by repeatedly moving toward "Neighbor 1" of each face, the system will circle around all the faces containing the new point and will eventually get back to the original face. Thus, the indexing creates a way to make a complete optimality check.

vi. Checking for Optimality of Mesh Quality

Figure 12A:
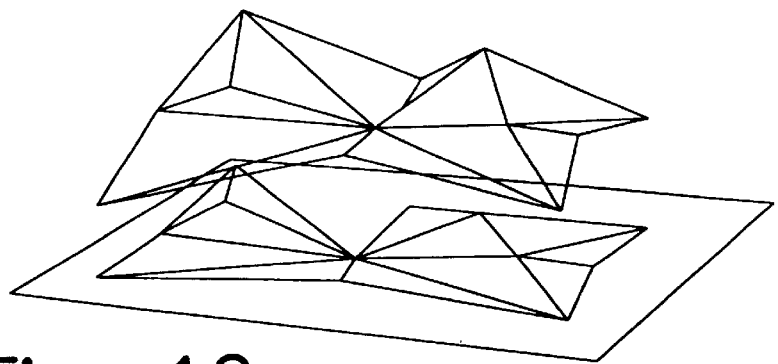
FIG. 12a Depicts a mesh construction projected on to a reference object that is a plane.
Figure 12B:
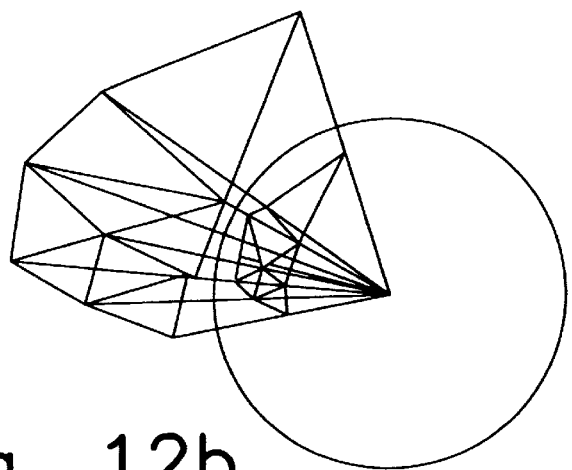
FIG. 12b Depicts a mesh construction projected on to a reference object that is a sphere.

Referring again to FIG. 10, incremental mesh building proceeds in step 514 to check the new point addition for optimality, re-organizing the mesh if the configuration created with the new point is not optimal in quality. In an exemplary embodiment, the optimal quality principle to be followed is the principle of Delaunay triangulation. To implement a Delaunay triangulation check the present invention projects the data point values in the mesh and 3D mesh configuration on to the reference object. FIG. 12*a* depicts a mesh construction projected on to a reference plane. FIG. 12*b* depicts a mesh construction projected on to a unit sphere. The present invention provides that the calculations for Delaunayian circumcircles and intersections shall be made with reference to those projected coordinates.

Figure 12C:
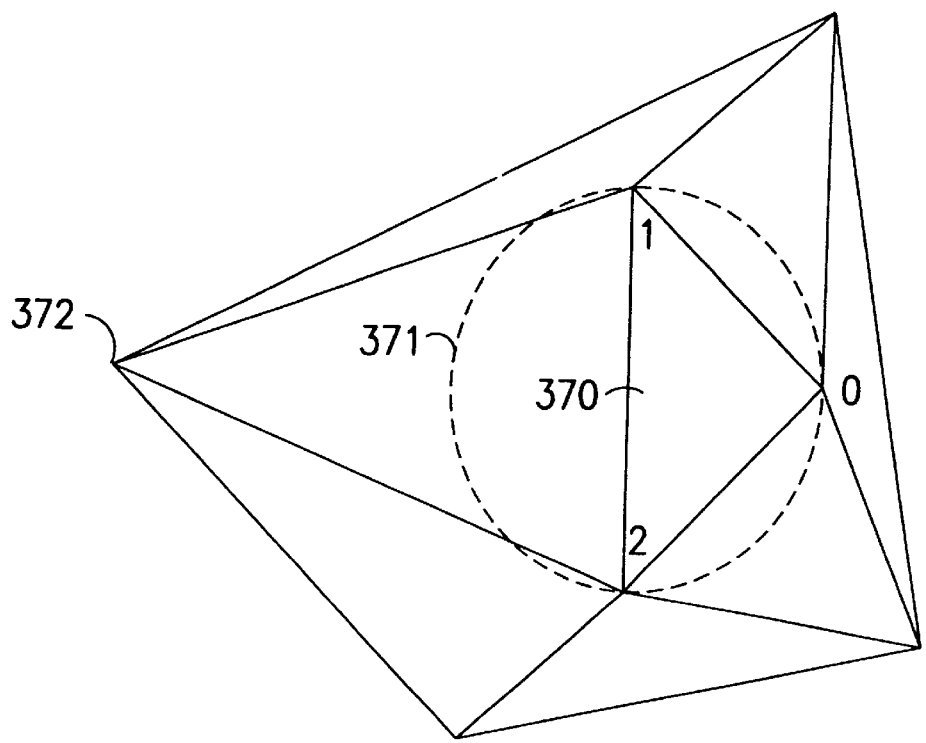
FIG. 12c Depicts two triangles checked for optimization.
Figure 12D:
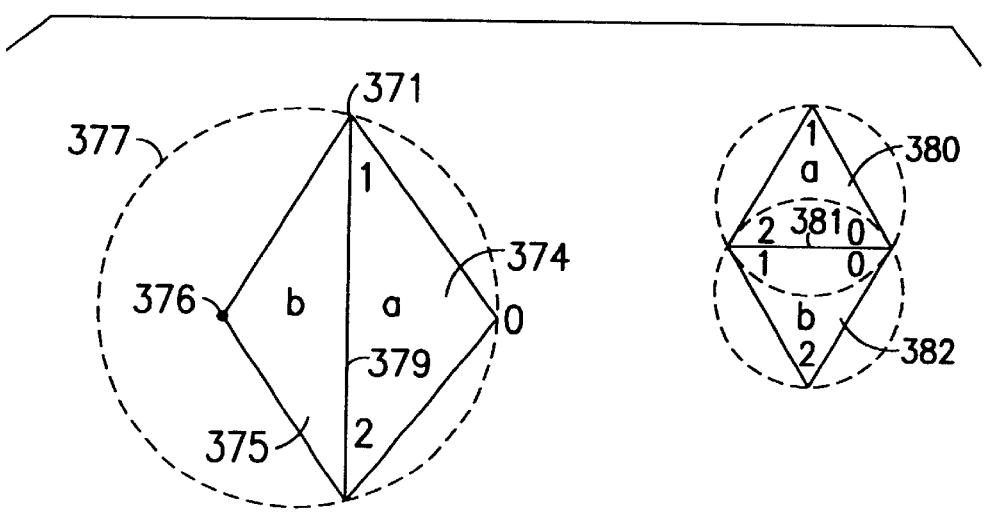
FIG. 12d Depicts a two triangle configuration where the triangles must be flipped and the resulting configuration after the flip.

FIGS. 12*c–d* depict the basic optimization principle of Delaunay triangulation as implemented in the present invention. For a triangle, e.g., triangle 370 in FIG. 12*c*, Delaunay principles hold that a circumcircle described by the three vertices of the triangle will not contain any other points of the mesh. In FIG. 12*c*, circumcircle 371 circumscribes no other point, such as point 372. Hence, triangle 370 is optimal by Delaunay principles.

FIG. 12*d*, on the other hand, depicts a triangle configuration (between triangle 374 and 375) that is not optimal and requires "flipping." As shown, circumcircle 377 for triangle 374 bounds point 376. In such a case, Delaunay principles hold that edge 379 must be flipped to create new edge 381 (as shown) and two new triangles 380 and 382. In creating the new configuration after point insertion, it may be necessary to make many flips while checking the resulting triangles for optimality. The present invention speeds the flipping process by creating a predetermined order to the checking and flipping.

Referring again to FIG. 10, the up res/insert procedure 132 begins in step 514 a procedure to check all triangles in the region of the insertion point for optimality. The basic procedure of this step is to check the triangles to determine whether they should be flipped. For each triangle tested, the processor in step 514 makes a call to a basic flip function 516 which tests a triangle, executes a flip if necessary and returns a yes/no flag showing whether it executed a flip.

Figure 13:
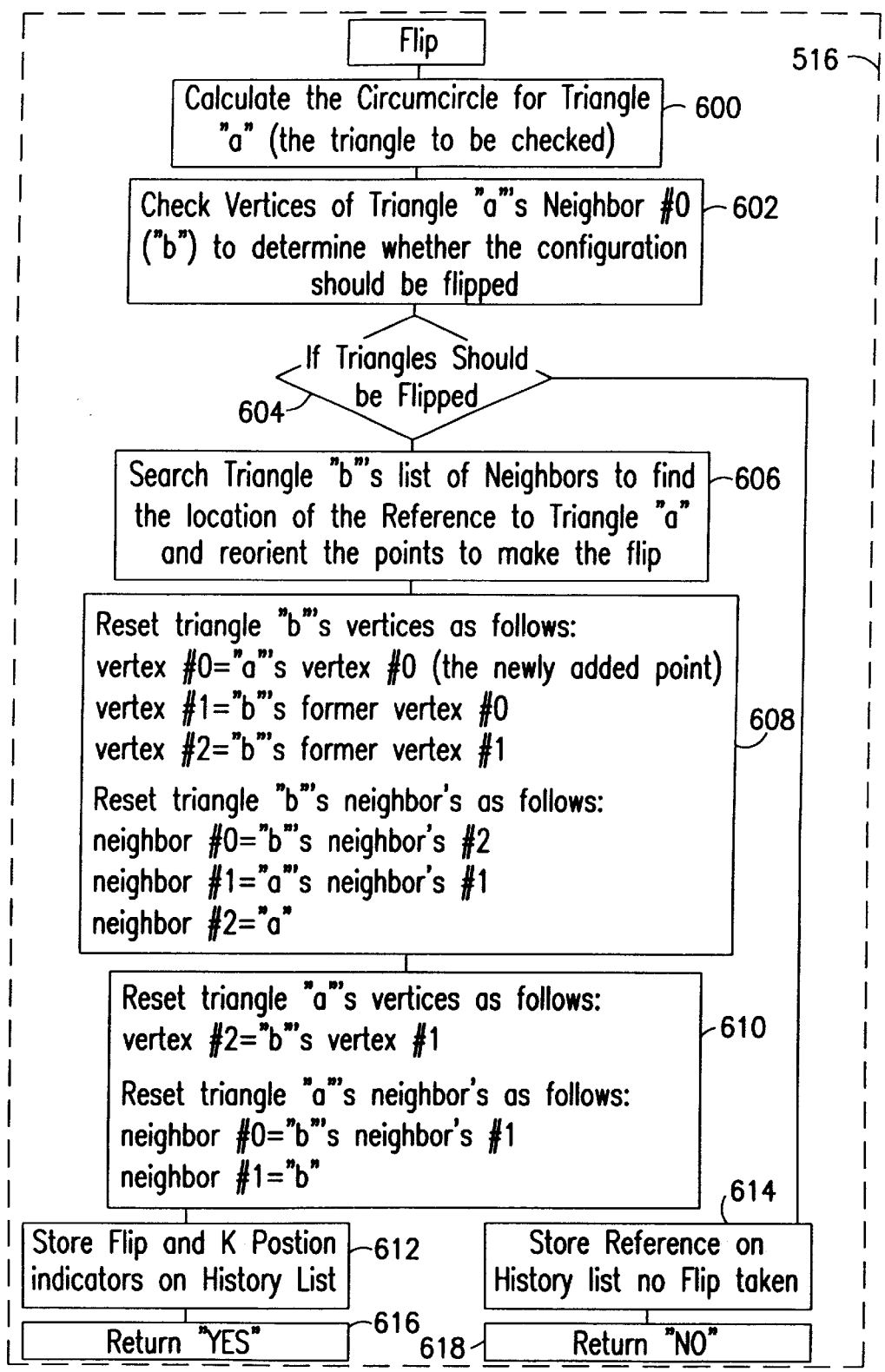
FIG. 13 Depicts an exemplary process flow for switching a link between two triangles when a flip occurs.

FIG. 13 depicts an exemplary process flow for exchanging a link for two triangles when a flip might occur. This is the execution of the flip function 516. In this discussion, reference is also made again to FIG. 12d which shows exchange of links in the mesh as the flip occurs. Referring to FIG. 12d, the procedure operates to check triangle "a", 374. Neighbor #0 of triangle "a" is triangle "b", 375.

Referring to the procedure of FIG. 13, the processor in step 600 proceeds to calculate a circumcircle (e.g., 377, FIG. 12d) for the triangle in question, e.g., Triangle "a". In an exemplary embodiment, the system calculates and stores the circumcircle equation for use in later checking procedures. This circumcircle equation can be reused until the triangle is altered by a point insertion or flipping. The storage of the equation provides additional processing speed. In step 602, the processor checks to insure that the vertices of Neighbor 0 (Triangle "b") do not fall within the circumcircle 377. If the points do fall within, the processor in step 604 determines that the edges of the triangles must be flipped.

Figure 12E:
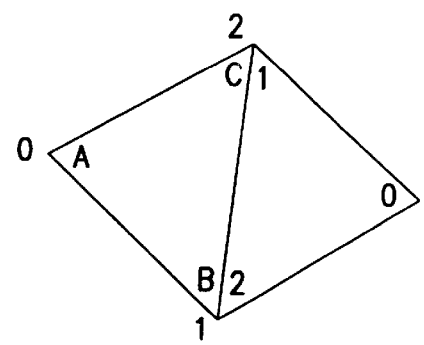
FIGS. 12e–g Depict possible vertex relationships between a triangle being checked and a neighbor.
Figure 12F:
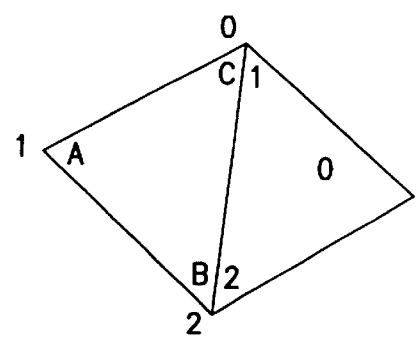
Figure 12G:
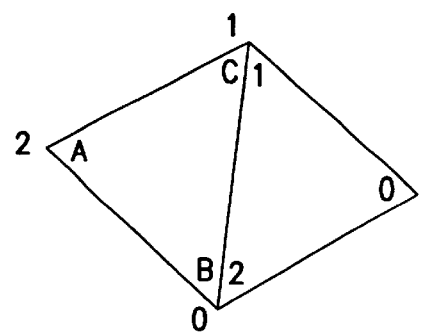

In step 606 of FIG. 13, the processor performs an adjustment to the face record for Triangle "b". The processor maintains the counterclockwise ordering of the triangles, vertices and neighbors, but realigns them so that the point bounded by the circumcircle, e.g., point 376, FIG. 12d will be in the Vertex 0 slot and Triangle "a" will be in the Neighbor 0 data slot of Triangle "b". FIG. 12e depicts the desired alignment between the Triangles "a" and "b". However, it is possible at the outset that the alignment between the triangles may have a different vertex ordering, such as shown in FIGS. 12f and 12g.

To reorient the vertices and neighbors, the processor first searches Triangle "b"'s neighbor list for the position of Triangle "a". For example, in FIG. 12f Triangle "a" would be in the Neighbor 1 slot opposite Vertex 1. In FIG. 12g, Triangle "a" would be in the Neighbor 2 slot opposite Vertex 2. The position of Triangle "a" in Triangle "b"'s neighbor list is represented by a variable, k such that Triangle "b" (Neighbor #k)=Triangle "a". Having located the k position, the processor in an exemplary embodiment reorients the face data structure for Triangle "b" as follows for the vertices. First, the processor sets Vertex k slot to the data point reference found in the Vertex (3-k) slot of triangle b. Second, the processor sets the Vertex (3-k) slot to the data point reference found in the Vertex 0 slot of triangle b. Third, the processor sets the vertex #0 slot to the initial data point reference found in Vertex k slot.

The neighbor references must also now be realigned to match the vertices as follows. First, the processor sets the Neighbor #k slot of Triangle "b" (originally a reference to Triangle "a") to the triangle face reference found in the neighbor (3-k) slot. The processor next sets the Neighbor (3-k) slot to the face reference contained in the Neighbor 0 slot of Triangle "b". Third, the processor sets the Neighbor 0 slot to a reference to Triangle "a" with the vertices and neighbors of Triangle "b". Readjusted, the two triangles will have the vertex alignment as shown in FIG. 12e.

Referring again to FIG. 13, the processor, after the realignment process of step 606, proceeds to execute the flip in step 608 and 610. In step 608, the processor reorganizes the vertices of (newly aligned) Triangle "b" as follows:

Vertex 0=Triangle "a"'s Vertex 0 (i.e., the newly added point)
Vertex 1=Triangle "b"'s Vertex 0
Vertex 2=Triangle "b"'s Vertex 1

In addition, the processor reorders the neighbor for Triangle "b" in step 608 as follows:

Neighbor 0="b"'s Neighbor 2
Neighbor 1="a"'s Neighbor 1
Neighbor 2=Triangle "a"

In addition, the processor in step 610 executes changes to the data structure to triangle "a". The Vertex 2 slot in Triangle "a"'s data structure is set to Triangle "b"'s Vertex 1. The Neighbor 1 link in Triangle "a" is replaced with a new link to Triangle "b". Also, "a"'s Neighbor 0 slot is now set to point to "b"'s former Neighbor 1.

With these changes the flip is complete and the former Triangle "a" and "b" 374, 375 in FIG. 12d are now redefined as triangles "a" and "b", 380 and 382. This invention teaches that the reorganization procedure in flipping preserves the setup and new point relationship created by the above described insert point procedure. In steps 612 and 614 the processor stores a reference to the outcome of the check on the history list (as shown below with reference to FIG. 14). In steps 616 and 618 the processor returns from the checking function.

vii. Checking All Triangles

With the flip function 516 described above the present invention can check all mesh faces that might be effected in point insertion. When a new point is added the new triangle configuration may need to be reorganized by flipping to maintain Delaunay optimality. In addition, the newly flipped triangles may require additional flipping to keep a state of optimality in relation to other neighbors. Referring back to FIG. 10, in step 514 the processor executes a systematic checking procedure when a new point is added.

Figure 14A:
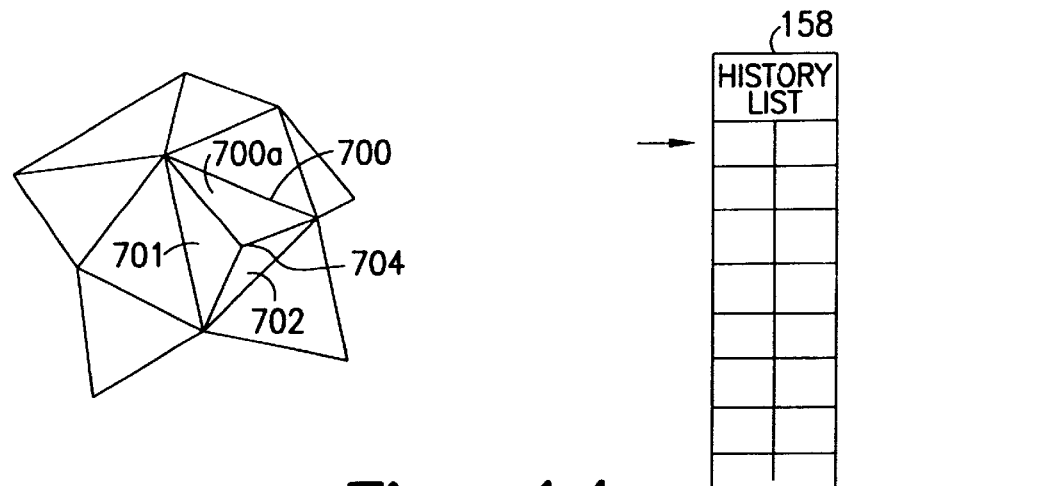
FIGS. 14a–j Depict an exemplary execution of a neighborhood checking procedure.
Figure 14B:
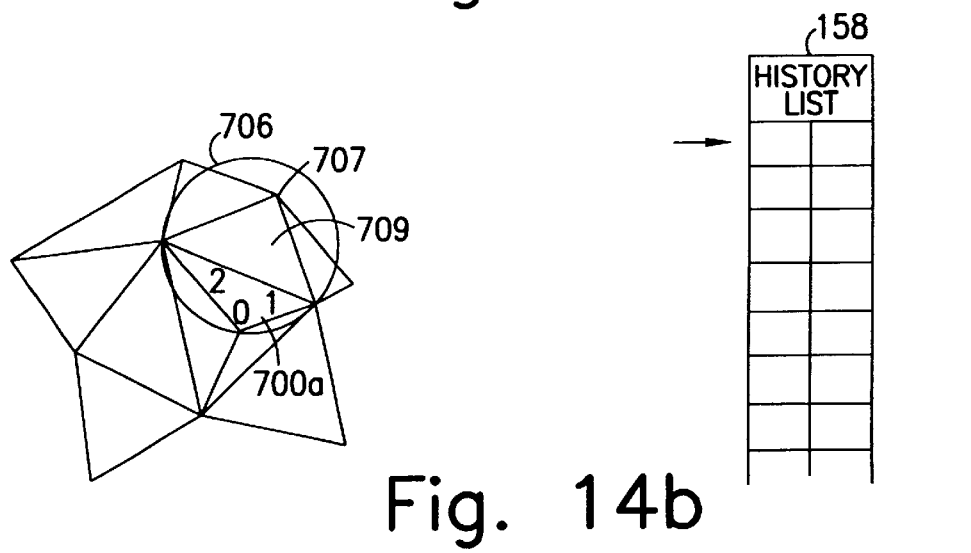

FIGS. 14a–j depict an exemplary execution of a neighborhood checking procedure for step 514. The present invention provides a rigid checking sequence. In the exemplary embodiment, the history list has two bit value slots for each history indicator as follows:

00=no flip
01=flip where the k value is the first slot
10=flip where the k value is the second slot
11=flip where the k value is the third slot It is understood, however, that other flip history list configurations are suitable. The rigid sequence permits the history list 158 to be created with little data overhead. The rigid checking sequence also provides that the flips made during checking can be later undone, reversed, or "flipped" following the history list in reverse as points are removed from the mesh. In the exemplary embodiment, the checking procedure works in a counterclockwise direction from an initial, "home face" triangle. In FIG. 14a, the system inserts point 704 into triangle 700. The insertion splits triangle 700 into three smaller subtriangles 700a, the revised face of triangle 700, triangle 701, the new right neighbor face of triangle 700a and triangle 702, the new left neighbor of triangle 700a. As can be seen, the history list 158 is blank as the insertion has required no revision. Checking for optimality begins with revised face 700a, the "home face." In FIG. 14b, 706 depicts a circumcircle created from the vertices of triangle 700a. As circumcircle 706 includes point 707, the triangle configuration is not optimal because it does not adhere to Delaunay principles. A flip must occur.

Figure 14C:
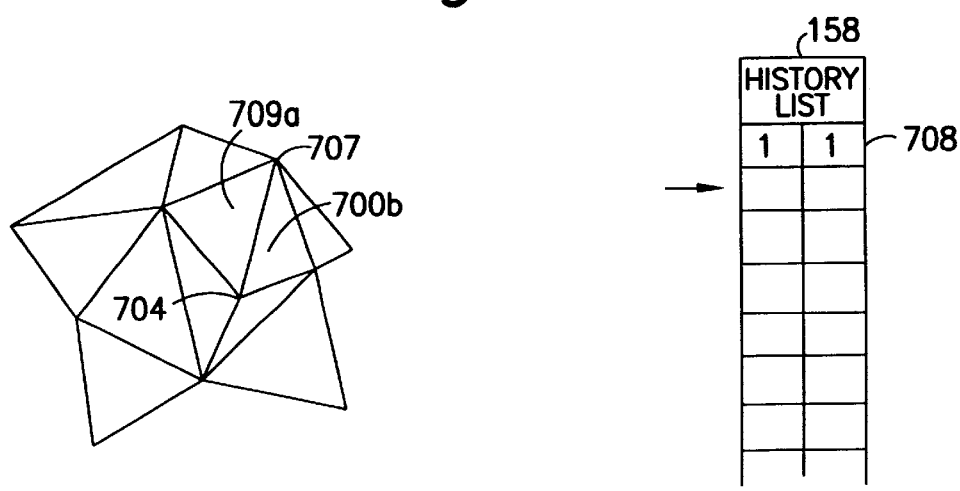

FIG. 14c shows the results of the flip procedure (described above). A new edge has been constructed between points 704 and 707, replacing the original point 1–2 edge of triangle 700. As described above, the processor revises triangle 700a to form triangle 700b. Triangle 709a is the revised form of triangle 709. The flip function (516, FIG. 10)

returns a "YES" value to indicate that a flip Qccurred. The flip function 516 also marks the flip by inserting a value, such as the "11" value placed on the history list 158 at position 708 and augmenting the stack pointer.

Figure 14D:
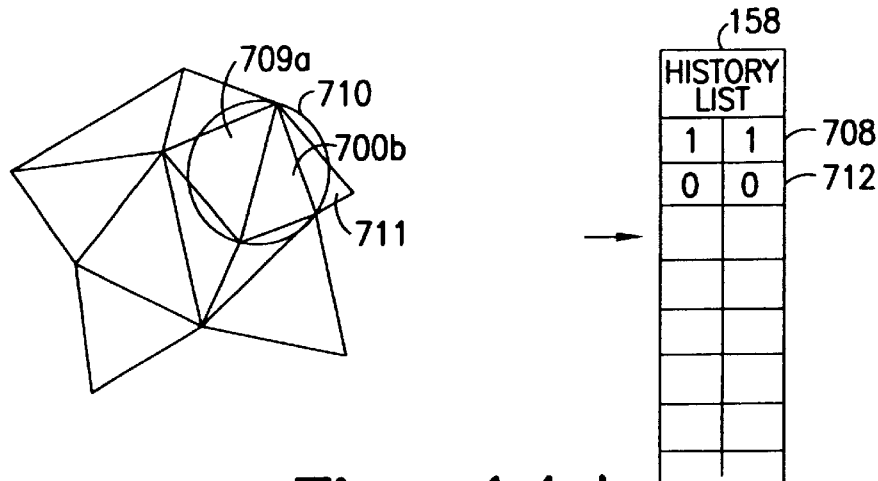

The triangles created by the flip will also require checking. Of the two triangles created, the procedure will remain on triangle 700 (now 700b) and create circumcircle 710 from its verticle and checks triangle 700b against triangle 711. That circumcircle is depicted in FIG. 14d. As triangle 700b is optimal, the checking procedure moves in a counterclockwise direction to triangle 709a. Before moving, the processor writes an indication of the result of the second check ("00") on the history list 158 (at position 712) and augments the pointer.

Figure 14E:
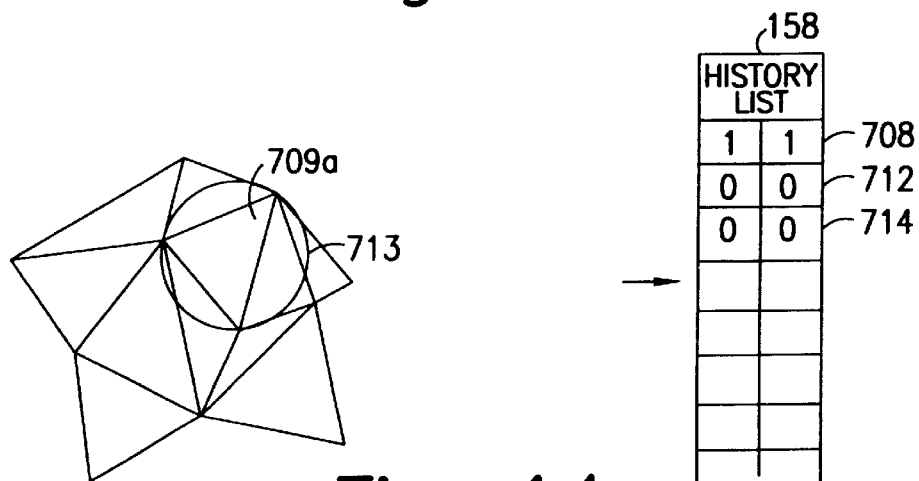

FIG. 14e depicts the check of triangle 709a. Circumcircle 713 shows that it bounds no points other than the vertices of the triangles, thus it is considered optimal in the exemplary embodiment. As the flip function (516, FIG. 10) returns a "NO" indication, the processor makes an indication of this result ("00") on the history list 158 (at position 714) and continues in a counterclockwise direction to the next neighboring triangle.

It is noted that the present invention's indexing system for faces, neighbors and vertices creates an easy way for counterclockwise (or clockwise) movement through the neighboring faces. The indexing system ensures that after insertion and during flipping the selection of neighbor #1 will always access the next face in counterclockwise direction. (The invention can also be configured for clockwise movement by, for example, reversing the index order of points and neighbors.)

Figure 14F:
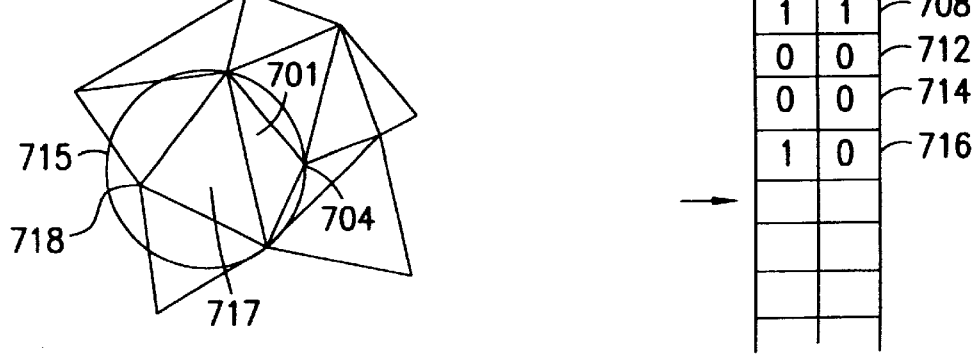
Figure 14G:
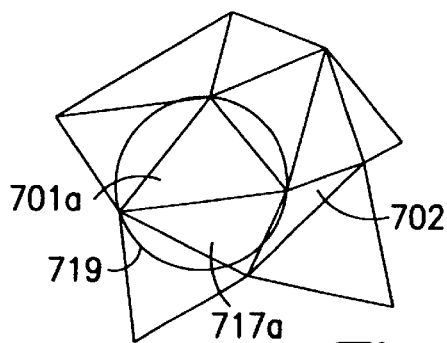

Following the counterclockwise movement, FIG. 14f depicts the checking procedure re-executed on the next triangle 701. Triangle 701 was one of the new triangles created upon insertion of point 704. When the system executes the flip routine, circumcircle 715 shows that point 718 of triangle 717 lies within its bounds. Such a configuration is not optimal and requires flipping. The flip function returns a "YES" indicator (e.g., 10 when the k value is the second slot) which is stored on the history list 158 (at location 716). The flip revises triangles 701 and 717 into flipped triangles 701a and 717a (FIG. 14g).

With the flip, the system must recheck triangle 701a. FIG. 14g depicts that check. In the call to the flip (516, FIG. 10), circumcircle 719 shows that it bounds no extraneous points. Hence, it is an optimal configuration. The flip function 516 returns a "NO" indicator and stores an indication ("00") at location 720 on history list 158.

Figure 14H:
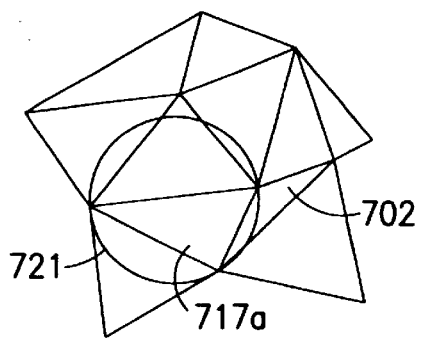

The checking routine continues in a counterclockwise direction to the revised triangle 717a. FIG. 14h shows circumcircle 721 computed from triangle 717a's vertices. The circumcircle shows that the triangle is optimal, and the flip function 516 writes a "NO" indicator ("00") to a location 722 on the history list. Checking moves in a counterclockwise direction to triangle 702.

Figure 14I:
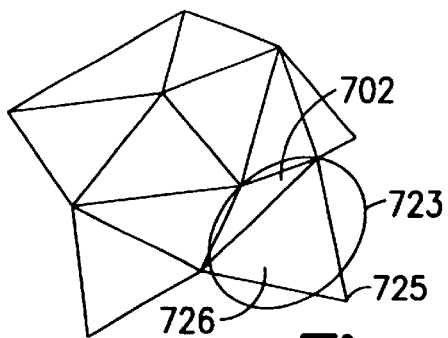

FIG. 14i depicts an optimality check on triangle 702. Circumcircle 723 shows that point 725 of triangle 726 lies outside and is not bounded. Consequently, the flip test for the triangle will return a "NO". In position 724, the flip function 516 enters an indicator ("00") for the negative result, and moves counterclockwise to the next triangle, 700b.

Figure 14J:
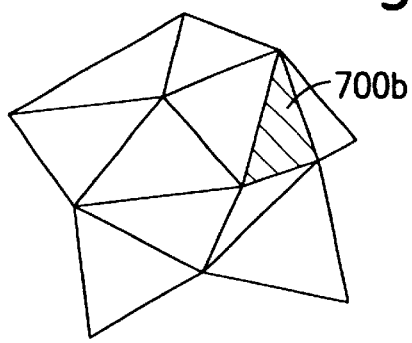

In FIG. 14j, triangle 700b is the face where the checking procedure began. The present invention provides that upon reaching the starting or home face in any neighborhood check the system can cease checking because the system has checked all triangles within the region of the insertion point for optimality.

Figure 15:
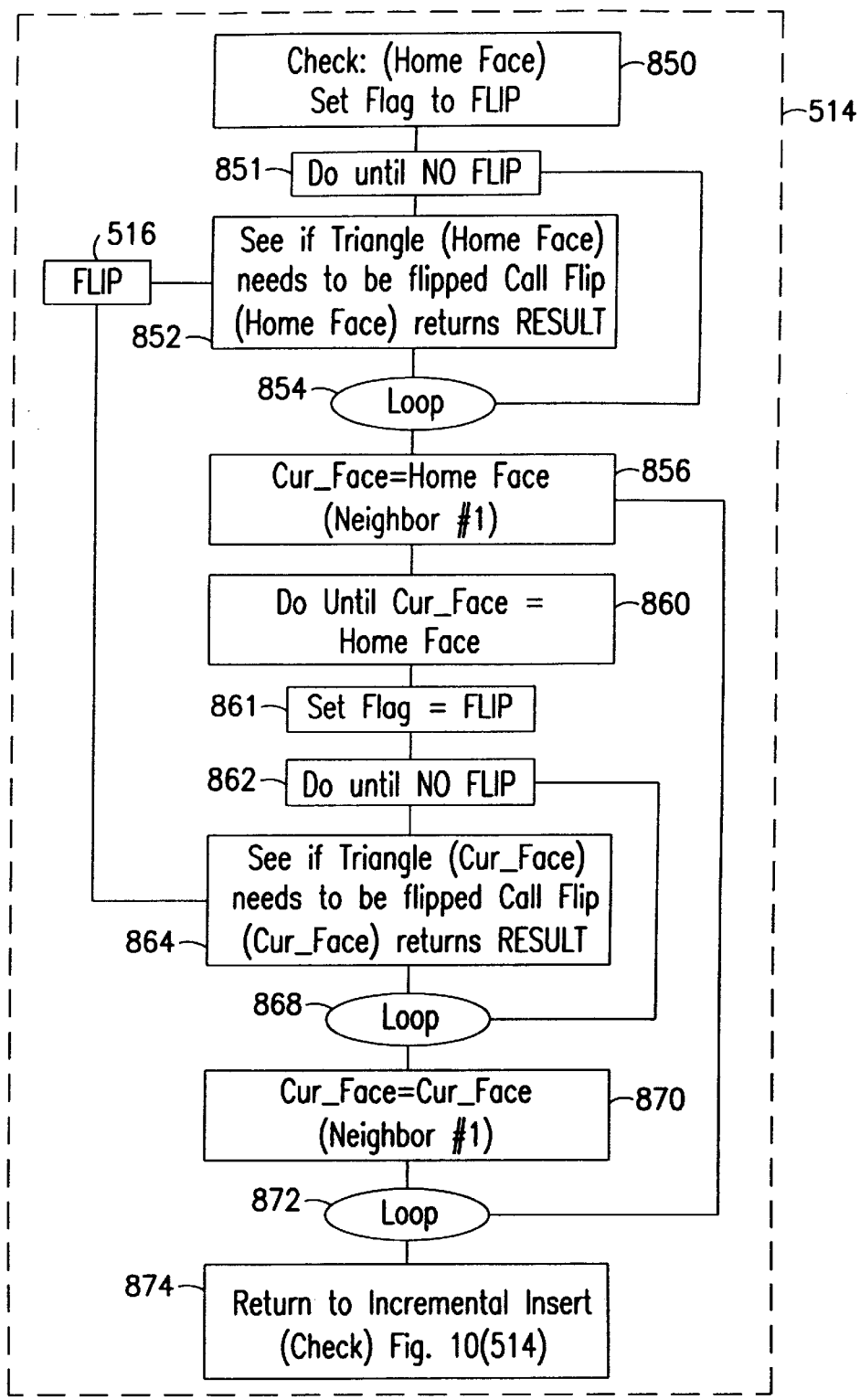
FIG. 15 Depicts an exemplary process flow for a neighborhood checking procedure according to the present invention.

FIG. 15 depicts an exemplary process flow for the checking procedure described above and referenced in step 514 of FIG. 10. Referring to FIG. 15, step 850 receives input: a pointer to the face, the home face, which must be checked. The check will proceed in a specific, (e.g. counterclockwise) direction about the neighborhood of triangles. The checking procedure begins and ends at the home face.

In step 851, the processor begins a loop to check the home face triangle until it needs no flipping. In step 852, the processor first checks the home face to see if it is optimal as revised (e.g., see triangle 700a in FIG. 14b). The flip function 516, called in step 852, calculates a circumcircle for the triangle in question and then determines if the remaining vertex in the Neighbor 0 triangle (i.e. the triangle opposite the newly inserted point) lies within the circle (This is the procedure described above with reference to FIG. 13.) If the remaining vertex does not lie within that boundary, the triangle passes the optimality test, because by the terms of a Delaunay triangulation, it is optimal. On passing the test, the flip function 516 returns a "FLIP" or "NO FLIP" indicator such as a boolean flag set to "1" or "0."

However, if the triangle in question fails the test, the edge joining the triangle in question and its opposite must be flipped. (The procedure for flipping this edge was described above with reference to FIG. 13.) If a flip is required, the flip procedure manages the face records in the mesh data structure 156 (FIG. 10), adds the reference to the history list 158 (FIG. 10) and returns a "FLIP" indicator to the checking procedure in step 852. If a flip has occurred, the home face must again be rechecked for optimality because it has been revised. In step 854, the processor loops to step 851 and continues checking the home face until it is optimal. When the home face has been optimized (e.g. there was no flip), the processor moves to step 856 and sets a current face to equal the next clockwise face in the order of checking. In the exemplary embodiment, that face is Neighbor 1 of the current face.

Step 860 begins a loop to check the remaining faces in counter-clockwise order. In step 861, a FLIP flag is reset. A secondary loop begins in step 862 to check each neighboring triangle until it requires no more flipping. Step 864 calls the flip function 516, which calculates a circumcircle using the vertices of the face in question, tests the remaining vertex in Neighbor 0 for optimality and writes to the history list 158 (FIG. 10) the results of flip. The flip function 516 also returns to the checking procedure an indication of whether a flip occurred: "FLIP" if a flip occurred; "NO FLIP" if the triangle is optimal. If the triangle was flipped it must be rechecked as described above. In step 868, the processor loops to step 862 which will continue checking the same triangle until it is optimal. Once the triangle checks, the processor moves to step 870 where the current face (the face in question) is reset to be the next counter-clockwise face (neighbor #1). In step 872, the processor loops to step 860 to begin the checking procedure for the next triangle. If, in step 860, the current face is the home face then the checking procedure has come full circle. It is now known that the mesh is optimal as all triangles pass the Delaunay criteria. In step 874, the procedure completes and the processor returns to the insert procedure step 514 (FIG. 10) and the task of inserting the next point of most significant detail.

vii. Resetting for Additional Point Insertions

Referring again to FIG. 10, the processor moves to reset the unmeshed points for additional up res insertions after the point has been added and checked. In step 518, the processor begins a loop to recalculate distances for all unmeshed points referenced on the unassigned listed 160. For each point, the processor must first locate a new face for distance calculations. To find those faces, the processor uses the steps of the locate function 186, as described above. ARer the processor calculates the distance, it then adds that new distance to the distance list 146, reheaping as necessary. When these points are processed, the system is again ready to insert additional points of increasing detail. In step 520, the processor loops to step 502 and continues until the up res/insert procedure is complete such as when the points are inserted to a desired tolerance.

viii. Down Resolution Deletion of Points

The system achieves downward resolution through removal of data points from the mesh. The insert list 154 provides an ordered list of data points ready for removal. The face list 144 contains reference to the face into which the system inserted the point. The system uses the history list 158 to play back all the flips in reverse order for that point insertion until the data point to be removed sits again within the triangle into which it was inserted. After the processor plays back the flips to reach an initial insertion configuration (such as that depicted in FIG. 11 or 14a), the data point can be removed from the mesh and the LEFT and RIGHT faces deleted. In downward resolution point removal, the present invention maintains the hierarchy of detail established in incremental insertion. The system removes points in last-in-first-out (LIFO) order. As the most recently added points add more refined details compared to the earlier added points, the downward resolution process of the present invention removes the finer details first and keeps points of most significant detail in the mesh.

Figure 16:
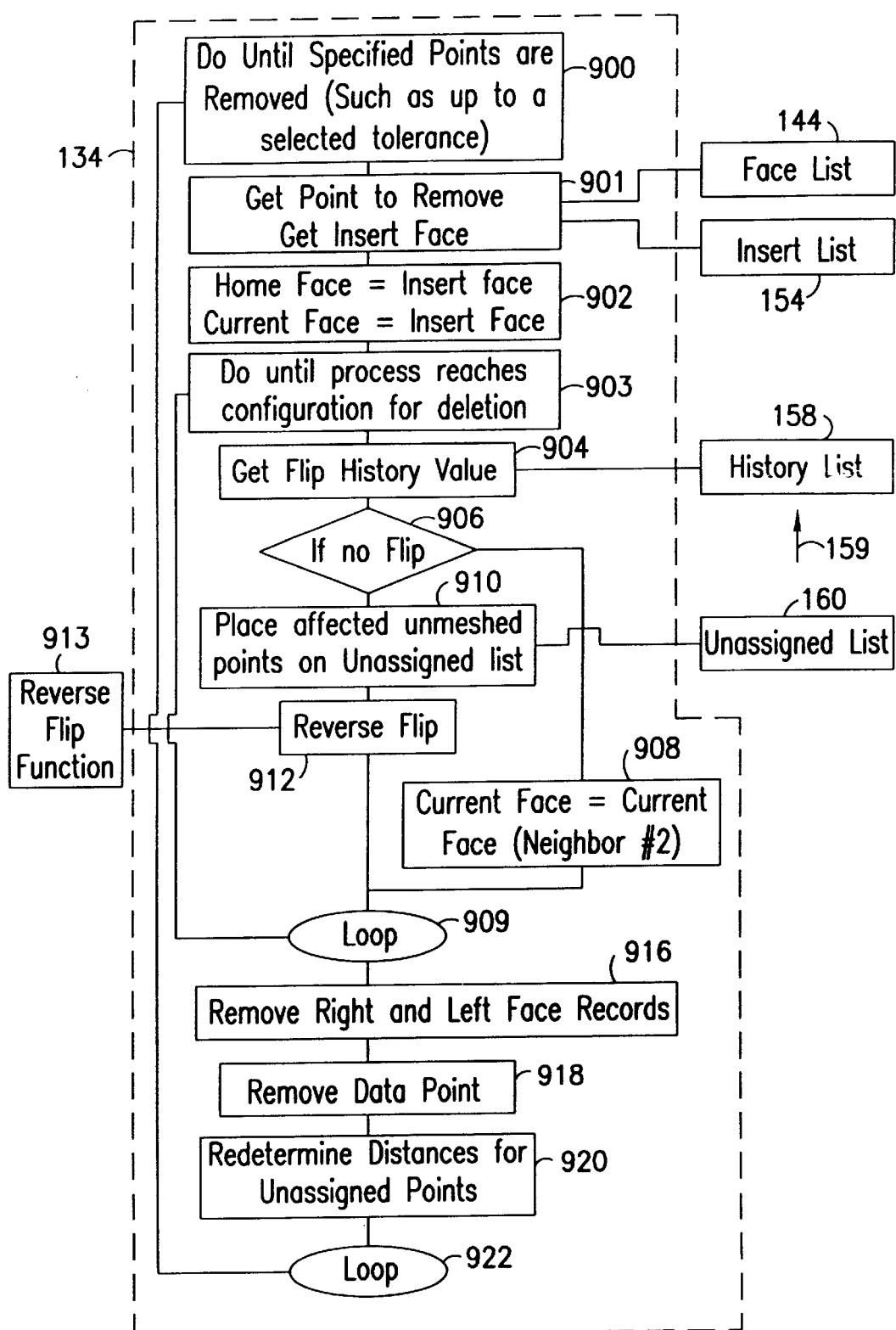
FIG. 16 Depicts an exemplary process flow for down res point removal.

FIG. 16 depicts an exemplary process flow and an exemplary down/res point removal function 134 (referenced in FIG. 4). Step 900 begins a processing loop to remove points until the occurrence of a user defined condition. For example, the system can remove points while the remaining unmeshed points have distances smaller than the specified tolerance (e.g., 1 millimeter). In step 901, the processor decrements the stack pointer on the insertion list 154 to obtain a reference to the data point to be removed. The processor also locates in the face list 144 the mesh location into which the system inserted the point (which is now revised, e.g., see 700, 700a and 700b, FIGS. 14a–j). The processor sets the home face pointer to the insert face in step 902. The processor sets a current face variable to be equal also to the insert face in step 902. The processor next proceeds to reverse all flips related to the point insertion, moving in a clockwise direction (opposite of the counter-clockwise direction used in the insert procedure above). It is understood that if the processor performed point insertion in a clockwise manner, point removal would proceed in an opposite, counterclockwise direction. The ordering of vertices and neighbors of the present invention dictates that Neighbor 2 of each triangle will move the checking procedure in a clockwise direction.

Step 903 begins a loop to reverse the series of flips that may occur during point insertion. The loop proceeds until the initial insertion configuration is re-achieved. This condition can be defined in many ways. In an exemplary embodiment the loop will proceed until the following conditions exist:

current face=home face; and current face (Vertex 0)=the point for removal;

Neighbor 1 (Vertex 0)=the point for removal;

Neighbor 2 (Vertex 0)=the point for removal; and current face (Vertex 1)=Neighbor 2 (Vertex 2);

current face (Vertex 2)=Neighbor 1 (Vertex 1);

Neighbor 2 (Vertex 1)=Neighbor 1 (Vertex 2).

Step 904 begins the flip reversal procedure by decrementing the pointer 159 of the history list 158 and grabbing the two bit flip history value (e.g., "00", "01", "10" or "11" value, as described above). In step 906 if the flip history value indicates that no flip occurred, the processor moves to step 908 and sets the current face point to Neighbor 2 of the current face. The processor in step 909 then loops to step 903 to continue checking the flip history of that new triangle.

Returning to step 906, if the history list value shows that a flip occurred, the processor must reverse the flip. In step 910, the processor places all the unmeshed data points that will be affected by a reverse flip onto the unassigned list 160. After point removal, the distances these points have from the mesh must be recomputed. (The process also adds the point to be removed to the unassigned list 160.) In step 912 the processor reverses the flip by invoking a reverse flip function 913. The reverse flip function 913 switches a flip configuration back to its original state. In FIG. 12d, for example, a reverse flip switches the configuration of triangles 382 and 380 back into the configuration depicted by triangles 375 and 374. Referring again to the process flow in FIG. 16, the function 913 reverses the flip between the current face and its neighbor #1 face. Compared to the example in FIG. 12d, the current face represents the "a" triangle and the Neighbor 2 face represents the "b" triangle.

In the exemplary embodiment the processor in the reverse flip function 913 resets Triangle "b" (the Neighbor 1 face's) vertices as follows:

Vertex 0="b"'s Vertex 1

Vertex 1="b"'s Vertex 2

Vertex 2="a"'s Vertex 1

The processor resets Triangle "a" (the current face's) Vertex 2 "b"'s Vertex 1. The processor also resets the neighbor links in Triangle "b" (the Neighbor 1 face) as follows:

Neighbor 0="a"

Neighbor 1="a"'s former Neighbor 0

Neighbor 2="b"'s former Neighbor 0

The processor resets the neighbor relationships for the "a" triangle (current face) as follows:

Neighbor 0="b"

Neighbor 1="b"'s (former) Neighbor 1

Neighbor 2=no change

The processor will also use the k value stored in the history list to reverse the point ordering that the processor performed to align the two triangles for a flip. That alignment procedure was described above with reference to FIGS. 12e–g.

After reversing the flip, with the function 913, the processor returns to the point removal procedure (FIG. 16) and returns in step 909 to the beginning of the checking loop (at step 903). This process of moving clockwise around the area in question and reversing flips using the history file continues until the processor returns to the home face. This process of reversing flips can be seen viewing in reverse order FIG. 14 from FIG. 14i to FIG. 14a. Using FIG. 14 as an example, the processing steps 903–914 of FIG. 16 continue until the state in FIG. 14a is reached. In FIG. 14a, the point for removal (e.g. point 704), is now enclosed in the home face triangle 700.

The processor removes the point in step 916 and removes the related faces: LEFT and RIGHT. FIG. 11 provides an example for depiction of this process. In FIG. 11, data point 360 sits in a center triangle, initially called FACE. To delete the RIGHT face, the processor sets the Neighbor 1 slot in FACE to Neighbor 1 (triangle 366). In Neighbor 1's data structure, the processor locates the Neighbor slot in which RIGHT was referenced and now sets that slot to FACE. To delete the LEFT face, the processor sets the Neighbor 2 slot in FACE to Neighbor 2 (triangle 368). In Neighbor 2's data structure, the processor locates the Neighbor slot in which LEFT was referenced and now sets that slot to FACE. In step 918, the processor then sets the Vertex 0 slot in FACE to be equal to the V2 slot of RIGHT (or V1 of LEFT). The data point is now removed from the mesh.

In step 920 the processor prepares for additional point removal or point additions by recalculating for all unmeshed points on the unassigned list 160 the distances they now have in relation to the current mesh (as described above). After that, the processor loops in step to return to step 900 in the point removal algorithm and either completes its process or continues removing points, such as to a user determined tolerance.

xi. Additional Use of the History List

The complete history of data point insertions from the initial mesh to full resolution can be computed in advance and then later used for even more rapid mesh generation. Such an additional use has advantages in applications such as computer games and other graphic applications, where the generation of objects and surfaces must occur at a rapid pace. For such applications, the computer system 3 of the present invention would be further configured to generate a complete, fall detail history list for the object in question, before the application is used. The computer system 3 would store the set of data points, the history list, the data structures for the initial mesh and the list of inserted points in the memory until the application required display of the mesh. Then, during execution of the of the application, the computer can generate dynamic up resolution or down resolution meshes, following the order of the insertion list and the history file. The processor would access the data in those lists using pointers to scroll through the lists. This use of the history list saves computation time in application. First as new points are added or removed from the mesh, distance values for the altered points would not have to be calculated. Second, use of the history list would save additional processing time because the computations in the sequence of checking steps to insure Delaunayian optimization would not have to be repeated.

The invention continues as described above. The above described embodiment of the invention is meant to be representative only, as certain changes may be made therein without departing from the clear teachings of the invention. Accordingly, reference should be made to the following claims which alone define the invention.

We claim:

1. A method for generating a mesh model of an object, comprising:

receiving an ordered set of data points, the data points including coordinates that describe the object;

when a minimum number of data points have been received, displaying an initial representation of the mesh model based on the received minimum number of data points; and increasing a resolution of the displayed mesh model by inserting into the displayed mesh model data points received after the minimum number of data points was received.

2. The method according to claim 1, wherein the ordered set of data points is received over an information network.

3. The method according to claim 1, wherein the minimum number of data points is the number of data points required to describe the basic shape of the object.

4. The method according to claim 1, wherein the minimum number of data points is determined based on a user specified tolerance level.

5. The method according to claim 1, wherein the data points are ordered so that a resolution of the displayed mesh model depends on a quantity of data points applied from the ordered set of data points.

6. The method according to claim 1, further comprising:

storing an insertion list of data points inserted during the display of the mesh model; and decreasing a resolution of the displayed mesh model by removing data points from the displayed mesh model based on the insertion list.

7. The method according to claim 6, wherein the data points are removed from the displayed mesh model in an order reverse to which they were stored in the insertion list.

8. A medium storing instructions adapted to be executed by a processor to perform the steps of:

receiving an ordered set of data points, the data points including coordinates that describe the object;

when a minimum number of data points have been received, displaying an initial representation of the mesh model based on the received minimum number of data points; and increasing a resolution of the displayed mesh model by inserting, into the displayed mesh model, data points received after the minimum number of data points was received.

9. The medium of claim 8, wherein the minimum number of data points is the number of data points required to describe the basic shape of the object.

10. The medium of claim 8, wherein the minimum number of data points is determined based on a user specified tolerance level.

11. The medium of claim 8, wherein the ordered set of data points is received over an information network.

12. The medium of claim 8, wherein the data points are ordered so that a resolution of the displayed mesh model depends on a quantity of data points applied from the ordered set of data points.

13. The medium of claim 8, further storing instructions adapted to be executed by a processor to perform the steps of:

storing an insertion list of data points inserted during the display of the mesh model; and decreasing a resolution of the displayed mesh model by removing data points from the displayed mesh model based on the insertion list.

14. The medium of claim 13, wherein the data points are removed from the displayed mesh model in an order reverse to which they were stored in the insertion list.

15. A method for displaying a mesh model of an object, comprising:

receiving a history list of ordered operations;

displaying an initial representation of the mesh model by performing a minimum number of the ordered operations stored in the history list; and increasing a resolution of the displayed mesh model by performing additional ordered operations stored in the history list after the minimum number of ordered operations.

16. The method according to claim 15, wherein the history list is received over an information network.

17. The method according to claim 15, wherein the minimum number of ordered operations is a quantity of ordered operations required to create a mesh model that describes the basic shape of the object.

18. The method according to claim 15, wherein the minimum number of ordered operations is determined based on a user specified tolerance level.

19. The method according to claim 15, wherein the ordered operations are ordered so that a resolution of the displayed mesh model depends on a quantity of ordered operations performed from the history list.

20. The method according to claim 15, further comprising:

decreasing a resolution of the displayed mesh model by performing the operations in an order reverse to which the operations are ordered in the history list.

21. A medium storing instructions adapted to be executed by a processor to perform the steps of:

receiving a history list of ordered operations;

displaying an initial representation of the mesh model by performing a minimum number of the ordered operations stored in the history list; and increasing a resolution of the displayed mesh model by performing additional ordered operations stored in the history list after the minimum number of ordered operations.

22. The medium of claim 21, wherein the history list is received over an information network.

23. The medium of claim 21, wherein the minimum number of ordered operations is a quantity of ordered operations required to create a mesh model that describes the basic shape of the object.

24. The medium of claim 21, wherein the minimum number of ordered operations is determined based on a user specified tolerance level.

25. The medium of claim 21, wherein the ordered operations are ordered so that a resolution of the displayed mesh model depends on a quantity of ordered operations performed from the history list.

26. The medium of claim 21, further storing instructions adapted to be executed by a processor to perform the step of:

decreasing a resolution of the displayed mesh model by performing the operations in an order reverse to which the operations are ordered in the history list.

27. A method for displaying a mesh model, comprising:

displaying an initial representation of the mesh model based on a first predetermined number of data points of a set of ordered data points;

increasing a resolution of the displayed mesh model by inserting, into the displayed mesh model, additional data points that follow the first predetermined number of data points in the set of ordered data points.

28. The method according to claim 27, wherein the predetermined number of data points is a quantity of data points required to describe the basic shape of the mesh model.

29. The method according to claim 27, wherein the predetermined number of data points is determined based on a user specified tolerance level.

30. The method according to claim 27, wherein the data points are ordered so that a resolution of the mesh model depends on a quantity of data points for the mesh model applied from the ordered set of data points.

31. The method according to claim 27, further comprising:

storing an insertion list of data points inserted during the display of the mesh model.

32. A method for displaying a mesh model, comprising:

displaying an initial representation of the mesh model based on a first predetermined number of data points of a set of ordered data points;

decreasing a resolution of the displayed mesh model by removing, from the displayed mesh model, data points of said first predetermined number of data points in said set of ordered data points in an order reverse to which they are ordered in said set of ordered data points.

33. The method according to claim 32, wherein the predetermined number of data points is determined based on a user specified tolerance level.

34. The method according to claim 32, wherein the data points are ordered so that a resolution of the displayed mesh model depends on a quantity of data points for the mesh model applied from the ordered set of data points.

35. The method according to claim 32, further comprising:

storing an ordered list of data points used during the display of the mesh model; and determining which data points to remove from the mesh model based on the ordered list of data points.

\* \* \* \* \*

UNITED STATES PATENT AND TRADEMARK OFFICE
CERTIFICATE OF CORRECTION

PATENT NO.     : 6,611,267 B2
DATED          : August 26, 2003
INVENTOR(S)    : Alexander Migdal et al.

It is certified that error appears in the above-identified patent and that said Letters Patent is hereby corrected as shown below:

Column 3,
Line 36, change "structure Delaunay's" to -- structure. Delaunay's --

Column 10,
Line 1, change "showning FIG." to -- shown in FIG. --
Line 59, change "3 ." to -- 3. --

Column 12,
Line 17, change "invention" to -- invention. --
Line 20, change "countercloclwise" to -- counterclockwise --

Column 13,
Line 43, change "arlequation" to -- an equation --

Column 15,
Line 28, change "alternatively intersection" to -- alternatively, intersection --

Column 16,
Line 11, change "413" to -- 413. --
Line 12, change ". The process" to -- The process --
Line 52, change "V. Incremental" to -- v. Incremental --

Column 21,
Line 1, change "Qccurred" to -- occurred --
Line 8, change "verticle" to -- vertices --

Column 23,
Line 3, change "ARer" to -- After --

Column 24,
Line 34, change "2 "b"'s" to -- 2="b"'s --

UNITED STATES PATENT AND TRADEMARK OFFICE
CERTIFICATE OF CORRECTION

PATENT NO. : 6,611,267 B2
DATED : August 26, 2003
INVENTOR(S) : Alexander Migdal et al.

It is certified that error appears in the above-identified patent and that said Letters Patent is hereby corrected as shown below:

Column 25,
Line 27, change "fall" to -- full --

Signed and Sealed this

Second Day of August, 2005

JON W. DUDAS
*Director of the United States Patent and Trademark Office*